United States Patent
Rodrigues et al.

(10) Patent No.: US 11,915,232 B2
(45) Date of Patent: Feb. 27, 2024

(54) OFFLINE TRANSACTION SYSTEM AND METHOD

(71) Applicant: MASTERCARD INTERNATIONAL INCORPORATED, Purchase, NY (US)

(72) Inventors: Elson Rodrigues, Mumbai (IN); Piyush Sharma, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1028 days.

(21) Appl. No.: 15/892,952

(22) Filed: Feb. 9, 2018

(65) Prior Publication Data

US 2018/0232732 A1    Aug. 16, 2018

(30) Foreign Application Priority Data

Feb. 15, 2017 (IN) .............................. 201711005382

(51) Int. Cl.
  *G06Q 20/38* (2012.01)
  *G06Q 20/32* (2012.01)
  (Continued)

(52) U.S. Cl.
  CPC ....... *G06Q 20/3829* (2013.01); *G06Q 20/223* (2013.01); *G06Q 20/327* (2013.01);
  (Continued)

(58) Field of Classification Search
  CPC ............... G06Q 20/223; G06Q 20/327; G06Q 20/3278; G06Q 20/3676; G06Q 20/40; G06Q 20/4033; G06Q 20/36
  See application file for complete search history.

(56) References Cited

U.S. PATENT DOCUMENTS

| | | | |
|---|---|---|---|
| 10,049,349 B1 * | 8/2018 | Grassadonia | G06Q 20/40 |
| 2007/0244831 A1 * | 10/2007 | Kuo | G06Q 20/3829 |
| | | | 705/67 |

(Continued)

FOREIGN PATENT DOCUMENTS

| | | | |
|---|---|---|---|
| WO | WO2015/148850 | 10/2015 | |
| WO | WO2015/159307 | 10/2015 | |
| WO | WO-2015148850 A1 * | 10/2015 | G06Q 20/12 |

OTHER PUBLICATIONS

Kai Ren, Bluetooth Pairing Part 3—Low Energy Legacy Pairing Passkey Entry, Aug. 25, 2016, bluetooth.com (Year: 2016).*

(Continued)

*Primary Examiner* — Zeshan Qayyum
*Assistant Examiner* — Taylor S Rak
(74) *Attorney, Agent, or Firm* — Talem IP Law, LLP

(57) ABSTRACT

A method is provided for performing a transaction. The method includes, in an offline mode, payee and payer devices communicating to determine transaction details including a transaction amount. A payer payment application generates a transaction request including request transaction details, stores the transaction request, and updates a payer available funds amount at least partially in accordance with the transaction amount. A payee payment application generates a transaction confirmation including confirmation transaction details, stores the transaction confirmation, and updates a payee available funds amount at least partially in accordance with the transaction amount. In an online mode, the payer payment application provides the transaction request to a payment processing device, the payee payment application provides the transaction confirmation to the payment processing device, and the payment processing device compares the request transaction details and confirmation transaction details and causes the transaction to be (Continued)

selectively performed depending on results of the comparison.

20 Claims, 15 Drawing Sheets

(51) Int. Cl.
    *G06Q 20/40*     (2012.01)
    *G06Q 20/22*     (2012.01)
    *G06Q 20/36*     (2012.01)

(52) U.S. Cl.
    CPC ..... *G06Q 20/3278* (2013.01); *G06Q 20/3676* (2013.01); *G06Q 20/382* (2013.01); *G06Q 20/40* (2013.01); *G06Q 20/4033* (2013.01); *G06Q 20/36* (2013.01); *G06Q 20/4012* (2013.01); *G06Q 20/40145* (2013.01); *G06Q 2220/00* (2013.01)

(56) References Cited

U.S. PATENT DOCUMENTS

| | | |
|---|---|---|
| 2009/0281945 A1 | 11/2009 | Shakkarwar |
| 2010/0133337 A1 | 6/2010 | Van Rensburg |
| 2011/0252240 A1 | 10/2011 | Freedman et al. |
| 2012/0078789 A1* | 3/2012 | Harrell ............. G06Q 20/12 705/44 |
| 2013/0030945 A1 | 1/2013 | Polt |
| 2013/0179344 A1 | 7/2013 | Georgoulas et al. |
| 2015/0046337 A1 | 2/2015 | Hu et al. |
| 2015/0278795 A1 | 10/2015 | Jiang et al. |
| 2015/0278811 A1* | 10/2015 | Lalchandani ......... G06Q 20/40 705/42 |
| 2016/0110696 A1* | 4/2016 | Angus ............... G06Q 20/108 705/39 |
| 2016/0149918 A1 | 5/2016 | Chai et al. |
| 2016/0171480 A1 | 6/2016 | O'Regan et al. |
| 2017/0161739 A1* | 6/2017 | Singh ............... G06Q 20/204 |
| 2017/0171194 A1 | 6/2017 | Durham et al. |
| 2017/0180132 A1 | 6/2017 | Osborne et al. |
| 2018/0144339 A1* | 5/2018 | Beidas ............... G06Q 30/06 |
| 2018/0276666 A1 | 9/2018 | Haldenby et al. |
| 2020/0052905 A1 | 2/2020 | Mathias et al. |

OTHER PUBLICATIONS

First Examination Report issued in Indian Application No. 201711005382, dated Dec. 31, 2020, pp. 7.
Non-Final Office Action issued in U.S. Appl. No. 16/175,245, dated Mar. 3, 2021, pp. 37.
Extended European Search Report issued in Application No. 17199424.7, dated Feb. 1, 2018, 12 pages.

\* cited by examiner

OFFLINE TRANSACTION SYSTEM AND METHOD

CROSS-REFERENCE TO RELATED APPLICATION

This application claims the benefit of and priority to Indian Patent Application No. 201711005382 filed Feb. 15, 2017. The entire disclosure of the above application is incorporated herein by reference.

FIELD

The present disclosure relates to a transaction system and method for performing transactions, particularly in an offline environment.

BACKGROUND

This section provides background information related to the present disclosure which is not necessarily prior art.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

It is known to provide payment applications that are executed using a client device, such as a smartphone or tablet. Such payment applications, commonly referred to as a mobile wallet, enable payments to be made using an account linked to the mobile wallet, such as a credit card account, bank account, or the like. In order for such payments to be made, the mobile wallet communicates with a payment system, such as a payment network server, which validates the payment and coordinates with an account holder, such as a card issuer, to cause an account of the user to be debited. As a result, such transactions need to be performed in an online environment, in which there is a data capable connection to the payment system. As a result, this makes such mobile wallets unsuitable for use in some situations.

SUMMARY

This section provides a general summary of the disclosure, and is not a comprehensive disclosure of its full scope or all of its features. Aspects and embodiments of the disclosure are set out in the accompanying claims.

In one broad form the present disclosure seeks to provide a method for performing a transaction, the method including using a system including a payee client device, a payer client device and at least one payment processing device and wherein the method includes:
  a) in an offline mode:
    i) having the payee and payer client devices communicate to determine transaction details including at least a transaction amount;
    ii) in a payer payment application executed by the payer client device:
      (1) generating a transaction request including request transaction details indicative of at least the transaction amount;
      (2) storing the transaction request; and,
      (3) updating a payer available funds amount at least partially in accordance with the transaction amount; and,
    iii) in a payee payment application executed by the payee client device:
      (1) generating a transaction confirmation including confirmation transaction details indicative of at least the transaction amount;
      (2) storing the transaction confirmation; and,
      (3) updating a payee available funds amount at least partially in accordance with the transaction amount; and,
  b) in an online mode:
    i) in the payer payment application, providing the transaction request to at least one payment processing device;
    ii) in the payee payment application, providing the transaction confirmation to the at least one payment processing device; and,
    iii) having the at least one payment processing device:
      (1) compare the request transaction details and confirmation transaction details; and
      (2) causing the transaction to be selectively performed depending on results of the comparison.

In one broad form the present disclosure seeks to provide a method for performing a transaction, the method including, in a payer client device:
  a) in an offline mode:
    i) communicating with a payee client device to determine transaction details including at least a transaction amount;
    ii) in a payer payment application:
      (1) generating a transaction request including request transaction details indicative of at least the transaction amount;
      (2) updating a payer available funds amount at least partially in accordance with the transaction amount; and,
  b) in an online mode providing the transaction request to at least one payment processing device, the at least one payment processing device causing the transaction to be selectively performed using the request transaction details.

In one broad form the present disclosure seeks to provide a method for performing a transaction, the method including, in a payee client device:
  a) in an offline mode:
    i) communicating with a payer client device to determine transaction details including at least a transaction amount;
    ii) in a payee payment application:
      (1) generating a transaction confirmation including confirmation transaction details indicative of at least the transaction amount;
      (2) updating a payee available funds amount at least partially in accordance with the transaction amount; and,
  b) in an online mode providing the transaction confirmation to at least one payment processing device, the at least one payment processing device causing the transaction to be selectively performed using the confirmation transaction details.

In one broad form the present disclosure seeks to provide a method for performing a transaction, the method including, in at least one payment processing device and in an online mode:

a) receiving, from a payer payment application, a transaction request including request transaction details indicative of at least a transaction amount;
b) receiving, from a payee payment application, a transaction confirmation including confirmation transaction details indicative of at least a transaction amount;
c) comparing the request transaction details and confirmation transaction details; and
d) causing the transaction to be selectively performed depending on results of the comparison.

In one broad form the present disclosure seeks to provide a system for performing a transaction, the system including a payee client device, a payer client device and at least one payment processing device and wherein the system performs a transaction by:
a) in an offline mode:
    i) having the payee and payer client devices communicate to determine transaction details including at least a transaction amount;
    ii) in a payer payment application executed by the payer client device:
        (1) generating a transaction request including request transaction details indicative of at least the transaction amount;
        (2) storing the transaction request; and,
        (3) updating a payer available funds amount at least partially in accordance with the transaction amount; and,
    iii) in a payee payment application executed by the payee client device:
        (1) generating a transaction confirmation including confirmation transaction details indicative of at least the transaction amount;
        (2) storing the transaction confirmation; and,
        (3) updating a payee available funds amount at least partially in accordance with the transaction amount; and,
b) in an online mode:
    i) in the payer payment application, providing the transaction request to at least one payment processing device;
    ii) in the payee payment application, providing the transaction confirmation to the at least one payment processing device; and,
    iii) having the at least one payment processing device:
        (1) compare the request transaction details and confirmation transaction details; and
        (2) causing the transaction to be selectively performed depending on results of the comparison.

In one broad form the present disclosure seeks to provide a system for performing a transaction, the system including a payer client device that performs a transaction by:
a) in an offline mode:
    i) communicating with a payee client device to determine transaction details including at least a transaction amount;
    ii) in a payer payment application:
        (1) generating a transaction request including request transaction details indicative of at least the transaction amount;
        (2) updating a payer available funds amount at least partially in accordance with the transaction amount; and,
b) in an online mode providing the transaction request to at least one payment processing device, the at least one payment processing device causing the transaction to be selectively performed using the request transaction details.

In one broad form the present disclosure seeks to provide a system for performing a transaction, the system including a payee client device that performs a transaction by:
a) in an offline mode:
    i) communicating with a payer client device to determine transaction details including at least a transaction amount;
    ii) in a payee payment application:
        (1) generating a transaction confirmation including confirmation transaction details indicative of at least the transaction amount;
        (2) updating a payee available funds amount at least partially in accordance with the transaction amount; and,
b) in an online mode providing the transaction confirmation to at least one payment processing device, the at least one payment processing device causing the transaction to be selectively performed using the confirmation transaction details.

In one broad form the present disclosure seeks to provide a system for performing a transaction, the system including at least one payment processing device and in an online mode:
a) receiving, from a payer payment application, a transaction request including request transaction details indicative of at least a transaction amount;
b) receiving, from a payee payment application, a transaction confirmation including confirmation transaction details indicative of at least a transaction amount;
c) comparing the request transaction details and confirmation transaction details; and
d) causing the transaction to be selectively performed depending on results of the comparison.

In one broad form the present disclosure seeks to provide a method for performing a transaction, the method including:
a) in a user client device associated with the user:
    i) creating a transaction request message including:
        (1) a predefined user code; and
        (2) an indication of a transaction to be performed;
    ii) transferring the transaction request message to at least one payment processing device in accordance with a predefined destination address associated with the at least one payment processing device;
b) in at least one payment processing device:
    i) receiving the transaction request message;
    ii) determining, using the received transaction request message:
        (1) a message originator address;
        (2) the predefined user code; and,
        (3) the transaction to be performed;
    iii) using the predefined user code and the originator address to validate an identity of the user; and,
    iv) causing the transaction to be performed at least partially in accordance with the identity of the user and the indication of a transaction to be performed.

In one broad form the present disclosure seeks to provide a method for allowing a user to perform a transaction, the method including, in a user client device associated with the user:
a) creating a transaction request message including:
    i) a predefined user code; and
    ii) an indication of a transaction to be performed;

b) transferring the transaction request message to at least one payment processing device in accordance with a predefined destination address associated with the at least one payment processing device, the at least one payment processing device being responsive to the transaction request message to:
   i) determine, using the received transaction request message:
      (1) a message originator address;
      (2) the predefined user code; and,
      (3) the transaction to be performed
   ii) use the predefined user code and the originator address to validate an identity the user; and,
   iii) cause the transaction to be performed at least partially in accordance with the identity of the user and the indication of a transaction to be performed.

In one broad form the present disclosure seeks to provide a method for allowing a user to perform a transaction, the method including in at least one payment processing device:
   a) receiving a transaction request message, from a user client device associated with the user, the transaction request message including:
      i) a predefined user code; and
      ii) an indication of a transaction to be performed;
   b) determining, using the received transaction request message:
      i) a message originator address;
      ii) the predefined user code; and,
      iii) the transaction to be performed
   c) using the predefined user code and the originator address to validate an identity the user; and,
   d) causing the transaction to be performed at least partially in accordance with the identity of the user and the indication of a transaction to be performed.

In one broad form the present disclosure seeks to provide a system for allowing a user to perform a transaction, the system including:
   a) a user client device associated with the user, the user client device:
      i) creating a transaction request message including:
         (1) a predefined user code; and
         (2) an indication of a transaction to be performed;
      ii) transferring the transaction request message to at least one payment processing device in accordance with a predefined destination address associated with the at least one payment processing device;
   b) at least one payment processing device, the at least one payment processing device:
      i) receiving the transaction request message;
      ii) determining, using the received transaction request message:
         (1) a message originator address;
         (2) the predefined user code; and,
         (3) the transaction to be performed
      iii) using the predefined user code and the originator address to validate an identity of the user; and,
      iv) causing the transaction to be performed at least partially in accordance with the identity of the user and the indication of a transaction to be performed.

In one broad form the present disclosure seeks to provide a system for allowing a user to perform a transaction, the system including, a user client device associated with the user, the user client device:
   a) creating a transaction request message including:
      i) a predefined user code; and
      ii) an indication of a transaction to be performed;
   b) transferring the transaction request message to at least one payment processing device in accordance with a predefined destination address associated with the at least one payment processing device, the at least one payment processing device being responsive to the transaction request message to:
      i) determine, using the received transaction request message:
         (1) a message originator address;
         (2) the predefined user code; and,
         (3) the transaction to be performed
      ii) use the predefined user code and the originator address to validate an identity of the user; and,
      iii) cause the transaction to be performed at least partially in accordance with the identity of the user and the indication of a transaction to be performed.

In one broad form the present disclosure seeks to provide a system for allowing a user to perform a transaction, the system including at least one payment processing device, the at least one payment processing device:
   a) receiving a transaction request message, from a user client device associated with the user, the transaction request message including:
      i) a predefined user code; and
      ii) an indication of a transaction to be performed;
   b) determining, using the received transaction request message:
      i) a message originator address;
      ii) the predefined user code; and,
      iii) the transaction to be performed
   c) using the predefined user code and the originator address to validate an identity of the user; and,
   d) causing the transaction to be performed at least partially in accordance with the identity of the user and the indication of a transaction to be performed.

It will be appreciated that the broad forms of the present disclosure and their respective features can be used in conjunction, interchangeably and/or independently, and reference to separate broad forms is not intended to be limiting.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

An example of the present disclosure will now be described with reference to the accompanying drawings, in which.

Corresponding reference numerals indicate corresponding parts throughout the several views of the drawings.

DETAILED DESCRIPTION

Embodiments of the present disclosure will be described, by way of example only, with reference to the drawings. The description and specific examples included herein are intended for purposes of illustration only and are not intended to limit the scope of the present disclosure.

Figure 1:
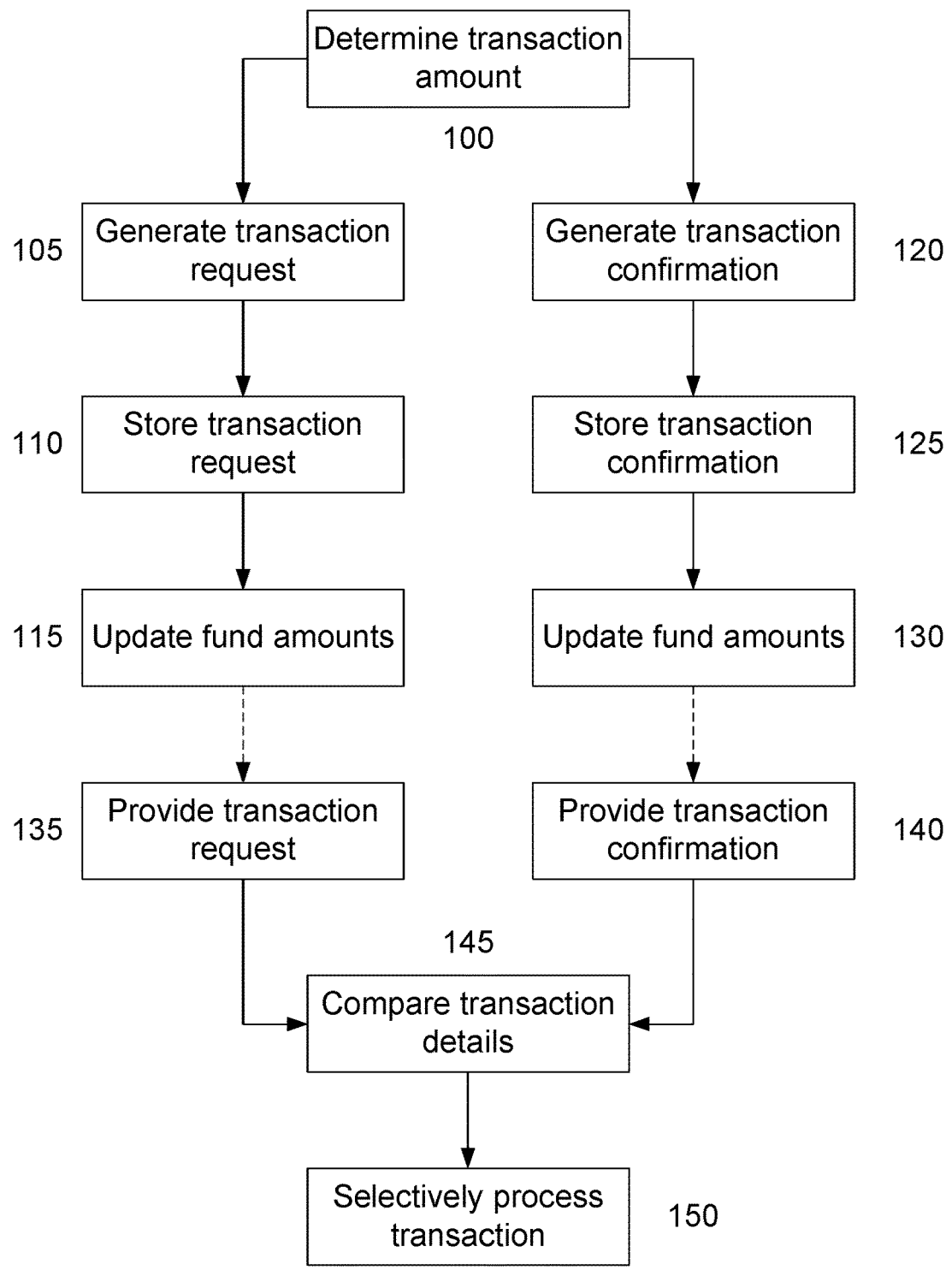
FIG. 1 is a flow chart of a first example of a method for performing a transaction.
Figure 2:
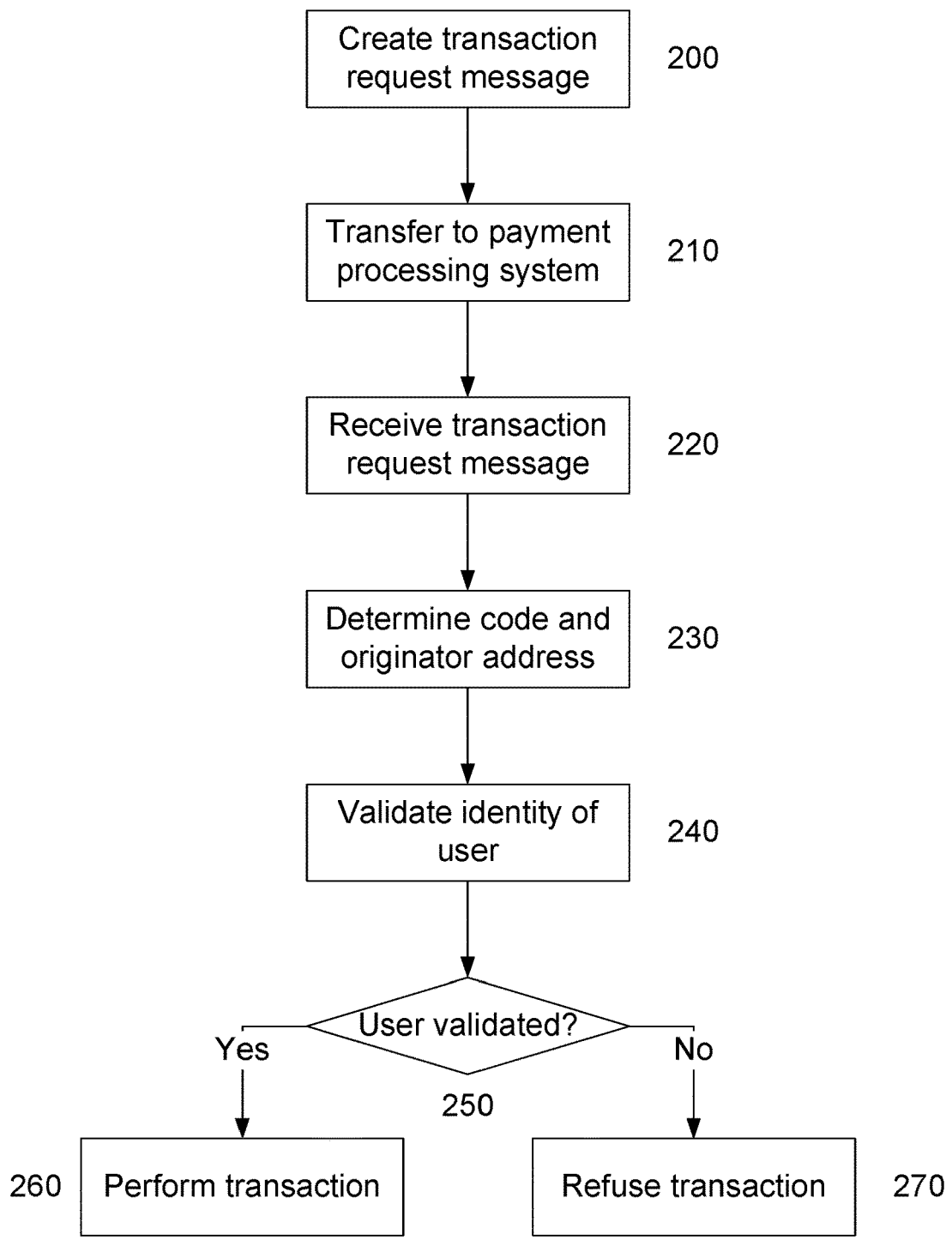
FIG. 2 is a flow chart of a second example of a method for performing a transaction.

Examples of methods for performing transactions will now be described with reference to FIGS. 1 and 2.

For the purpose of these examples, it is assumed that the transactions are performed in part utilizing one or more client devices that in use interact with one or more payment processing devices. The payment processing device(s) are typically part of one or more processing systems, such as one or more servers, and may form part of a payment network backend, or similar. For the following description reference will generally be made to a single payment processing device, but it will be appreciated that the functionality performed by the payment processing device could in practice be distributed across multiple processing devices and reference to a single device is not intended to be limiting. The client device is typically a suitably programmed mobile communications device, such as a mobile phone, tablet, or the like, which can be connected to the payment processing device(s) via a communications network. The client devices typically execute payment applications, such as a mobile wallet, or the like, depending on the preferred implementation.

In normal operation, when transactions are being performed, the client devices are in communication with the payment processing devices via one or more communications networks, which is generally referred to as an "online" mode. However, in the current examples, the client devices and payment processing devices are further configured to allow transactions to be performed when the client devices involved are unable to communicate with the payment processing devices, for example, due to communications network availability issues or the like, which is generally referred to as an "offline" mode.

It will be appreciated that the terms online and offline are used to refer to the ability of the client and payment processing devices to communicate, but these terms are not intended to be otherwise limiting. For example, these terms are not intended to refer to particular operational states of particular communications networks, and hence the term offline may apply when the client device is able to connect to the communications networks, but the payment processing device is unavailable. Where a transaction involves two client devices, the term offline mode can refer to a situation in which at least one of the client devices is unable to communicate with the payment processing device(s) and does not necessarily require that both client devices are unable to communicate with the payment processing device(s).

The various embodiments which will be described in further detail typically enable a transaction to be performed between a payee and a payer whilst in an offline mode. Generally, funds in a payment application respectively associated with each of the payer and payee are updated so that the respective payer and payee are always aware of funds available for subsequent transactions. Additionally, required transaction messages, including a transaction request and transaction confirmation, are generated at the time the parties commence the transaction, so further processing by the client devices is not required. Nevertheless, the transaction is only ultimately processed once the payer and payee client devices have both returned to an online mode and subsequently provided the respective transaction request and transaction confirmation to the payment processing device. This enables the payment processing device to validate the transaction in accordance with normal transaction protocols, thereby reducing the opportunity for fraudulent transactions. Accordingly, it would be appreciated that there is enablement for offline transactions to be effected whilst maintaining the security of an online transaction process.

In a first example described with reference to FIG. 1, a transaction is performed between a payee and a payer each having a respective client device, hereinafter referred to as payer and payee client devices respectively.

In this example, in an offline mode the payee and payer client devices communicate to determine transaction details, including at least a transaction amount, at step 100. This is typically achieved by establishing a direct point-to-point communications channel between the payee and payer client devices, such as a Bluetooth®, NFC (Near Field Communications) channel, or the like. Transaction details entered into the payee or payer client device can then be shared with the other client device, via the communications channel. Whilst this could alternatively be achieved manually, for example, by having each of the payee and payer enter the transaction amount into their respective client device, this can lead to errors in the input which could in turn impact on the subsequent downstream process so this is generally not preferred, although not necessarily precluded.

In this example, at step 105, the payer payment application generates a transaction request including transaction details indicative of at least the transaction amount. The transaction details may also include any other additional information required to perform the transaction, including, but not limited to, information regarding the payee or payer, such as a name or other identifier, payer authentication information, nomination of particular payer account, a shared secret, encryption logic or the like, and further examples of this will be discussed in more detail below. At step 110, the transaction request is stored in a memory of the client device allowing this to be subsequently retrieved.

At step 115, the payer payment application updates an available funds amount, indicative of available funds associated with a payer account, such as available funds in the mobile wallet application. Thus, this can be used to indicate a reduced balance of funds reflecting the amount of funds transferred as part of the transaction. The updated available funds amount may also take into account any additional funds, such as a transaction fee, or the like. The mobile wallet application shall store a record of the available balance whether the payer is offline or online.

Also in the offline mode, at step 120, the payee payment application operates to generate a transaction confirmation including confirmation transaction details indicative of at least the transaction amount. The confirmation transaction details may also include any other required information, and could include information regarding the payee or payer, payee authentication information, a payee destination account, a shared secret, or the like. It will be appreciated that the confirmation transaction details could be identical to the request transaction details, or could be different, but with at least some overlapping transaction details which are common to both the transaction request and the transaction confirmation.

Again, the transaction confirmation is stored in the memory of the payee client device, at step 125, with a payee funds amount optionally being updated, at step 130, to reflect a new funds amount based on the funds received as part of the transaction, and, optionally, taking into account any transaction fees or the like.

The above steps can be performed substantially simultaneously, with the payee and payer client devices operating to generate the transaction request and transaction confirmation at substantially the same time. Alternatively, however, this may be performed sequentially with the transaction confirmation only being completed after the transaction request has been generated and stored, for example, with this fact being communicated to the payee application via the direct communications channel.

Whilst the payee and payer client devices remain in an offline mode, the transaction confirmation and transaction request remains stored on the client device. Once an online mode has commenced, the payer payment application provides the transaction request to a payment processing device, at step 135, whilst the payee payment application provides the transaction confirmation to the payment processing device, at step 140. It will be appreciated from this that whilst the above described steps can be performed entirely in an offline mode, a substantially similar process can be performed if one of the client devices is in fact online, with the transaction confirmation or transaction request being transmitted substantially directly, and only being transiently stored before transmission to the payment processing device.

The payment processing device can then compare the request transaction details and confirmation transaction details, at step 145, selectively processing the transaction depending on results of the comparison, at step 150. In particular, this typically involves ensuring that transaction details common to both the transaction request and transaction confirmation match.

Accordingly, it will be appreciated that the above described process enables a transaction to be performed between a payee and a payer whilst in an offline mode. As part of this process, funds in a payment application associated with each of the payer and payee are updated so that the respective payer and payee are fully aware of funds available for subsequent transactions. Additionally, required transaction messages, including a transaction request and transaction confirmation, are generated at the time the parties commence the transaction, so further processing by the client devices is not required. Nevertheless, the transaction is only ultimately processed once the payer and payee client devices have both returned to an online mode and subsequently provided the respective transaction request and transaction confirmation to the payment processing device. This enables the payment processing device to validate the transaction in accordance with normal transaction protocols, thereby reducing the opportunity for fraudulent transactions. Accordingly, it would be appreciated that the above described system enables offline transactions to be effected whilst maintaining the security of an online transaction process.

A number of further features will now be described.

In one example, in the offline mode, the payer payment application encrypts the transaction request and then stores the encrypted transaction request, allowing this to be transferred to the payment processing device in the online mode, with the payment processing device decrypting the transaction request in order to determine the request transaction details. This can be used to ensure that the transaction request cannot be subsequently tampered with or otherwise altered after generation, for example, to prevent attempts to fraudulently reduce the transaction amount and thereby gain financially. The transaction request can be encrypted in any appropriate manner, but in one example is encrypted using a public key of a public/private key pair of the payment processing device, thereby ensuring that only the payment processing device is able to decrypt the transaction request and thereby recover the request transaction details. This avoids the content of the transaction request being viewed by either the payer or any other third party, for example, in an attempt to obtain details of the payer's account, authentication information, or the like. It will also be appreciated, however, that other encryption techniques could additionally or alternatively be used. For example, the transaction request could be encrypted using a symmetric one time encryption key, or the like. The transaction request could also be digitally signed using a private key of the payer payment application, allowing the payment processing device to validate the source of the payment request.

It will be appreciated that a similar process can be performed in respect to the transaction confirmation. In this example, the payee payment application encrypts the payment transaction confirmation and then stores this in the offline mode, with the payment processing device operating to decrypt the encrypted transaction confirmation once this is received in the online mode. Again, this can be performed in a similar manner for similar reasons, and this will not therefore be described in any further detail.

The transaction request and the transaction confirmation can be stored by the payer and payee payment application respectively either until an online connection is established, for example, when the client device detects connection to a communications network, or until a transaction query is received from the payment processing device. In this latter instance, the payment processing device can be adapted to periodically broadcast transaction queries to any connected client devices, such that if a transaction query is received by the payment application, the payment application can respond providing any stored transaction requests or transaction confirmations, allowing these to be processed.

The transaction details can be determined by the client devices in any appropriate manner. Typically, however, this includes having the payer payment application determine at least a transaction amount in accordance with user input commands. Thus, once a payment application has been launched and communication established with the payee client device, the payer can be prompted to enter a transaction amount, with the transaction being performed on this basis.

The manner in which communications are established between the payee and payer client devices will vary depending upon the preferred implementation. In one example, the method includes establishing a short range wireless communication channel, such as an NFC or Bluetooth® connection between the payee and payer client devices. In order to perform this, it is important to ensure that the payee and payer client devices that are connected are the correct devices, which is typically achieved by having the payer and payee client devices determine respective authorization codes, which are then compared, with the communications channel only being established if the authorization codes match. This can be achieved in any appropriate manner but typically involves having one of the client devices generate and display an authorization code, with this being communicated to the user of the other client device, with the user then entering this authorization code onto their client device. The client devices then exchange codes to ensure these match.

In order to allow both of the payer and payee payment applications to know transaction details, and optionally other information, such as the shared secret, it is typical for this information to be established by one of the payment applications and then shared with the other payment application via a communications channel between the client devices. In one example, this is achieved by having the payer payment application provide a transaction message to the payee client device via the communications channel, the transaction message including message transaction details including at least the transaction amount. This allows the payee payment application to use the transaction message to generate the transaction confirmation. However, it will be appreciated that sharing of the transaction details can be performed in any appropriate manner. The transaction message can be encrypted, for example, using a session key or one or more keys associated with the payer or payee payment applications, thereby ensuring the message transaction details cannot be intercepted by third parties.

In one example, in order to further enhance the security of the transaction process the payee and payer payment applications establish a shared secret in the offline mode, which is then utilized by the payment processing device in order to authorize the transaction. In particular, this is typically achieved by providing an indication of the shared secret in the transaction request and transaction confirmation, allowing the payment processing device to use each indication of the shared secret to authorize the transaction. The shared secret can be of any appropriate form and could include a unique one time code, a secret key, a digital signature, a digital signature generated using a public or private key of a public/private key pair, a digital signature which is generated using transaction details, a digital signature which is generated using the secret key, or the like. The shared secret is typically established by having the payee and payer client devices communicate and exchange the secret in the offline mode, making it unlikely that this could be ascertained by third parties, thereby preventing fraudulent provision of a fake transaction confirmation or transaction request. Similarly, if the shared secret is provided as part of an encrypted transaction request or transaction confirmation this can only be decrypted by the payment processing device thereby ensuring security of the shared secret.

In one example, the payer payment application determines if a number of offline transactions will exceed a limit and confirms the transaction can proceed depending on the determination. In particular, it is typical for only a limited number of offline transactions to be authorized absent any verification of the transactions by the payment processing device, to thereby prevent payers performing transactions when insufficient funds are available, for example, by fraudulently altering an available balance in the payment application. Whilst any number of transactions could be defined, in one example, the limit is two transactions in the offline mode. It will be appreciated, however, that the transaction limit could be set on a user by user basis, so that trusted users, or users with particular pre-authorization could have a higher transaction limit.

Similarly, the payer payment application can also determine if sufficient funds exist in order to perform a transaction. In this example, the payer payment application determines the transaction amount and then compares the transaction amount to a payer available funds amount. The transaction is only then performed depending on results of the comparison, and in particular if the transaction amount is less than the available funds amount.

In order to prevent the system being used fraudulently, the payer, and optionally the payee, undergo authentication prior to the transaction being performed. This can be achieved in any suitable manner and, in one example, involves determining payer authentication information, attempting to authenticate the payer using the payer authentication information and selectively confirming if the transaction can proceed based on an outcome of the attempt. The authentication information can be of any appropriate form and could include biometric information determined using a biometric reader, such as a fingerprint scanner, iris scanner, or the like, or could include a personal identification number (PIN), or other unique code or password, which is determined using payer input commands provided via an input device, such as a touch screen. Thus, it will be appreciated that this ensures that the person utilizing the payer client device in order to perform the transaction is the legitimate authorized user of the payer payment application, and hence is authorized to perform the transaction. This maintains security of the system even in the event that a third party is able to access the payer client device. A similar process can also be performed in respect of the payee.

In the online mode, the payment processing device typically updates a payee account balance in a payee account and a payer account balance in a payer account to thereby effect the transaction. In this regard, it will be appreciated that this can be achieved in accordance with existing payment processes, for example, by having the payment processing device contact financial institutions, such as account holders or card issuers, of the payee and payer.

As previously mentioned, the payer payment application generates a transaction request including request transaction details which typically include one or more of the transaction amount, a payer funds amount, a transaction account identifier, a transaction identifier, a transaction time, a transaction date, a payer identifier, a payee identifier, a secret key, information encrypted using a secret key or a signature generated using a private key of a payer public/private key pair.

Similarly, the payee payment application generates a transaction confirmation including confirmation transaction details, which typically includes one or more of the transaction amount, a transaction account identifier, a transaction identifier, a transaction time, a transaction date, a payer identifier, a payee identifier, a secret key, information encrypted using a secret key or a signature generated using a private key of a payer public/private key pair.

The payer payment application may also generate a transaction message including message transaction details including one or more of the transaction amount, a transaction identifier, a transaction time, a transaction date, a payer identifier, a secret key or a signature generated using a private key of a payer public/private key pair.

In one particular preferred example, the method includes establishing a communications channel between the payee and payer client devices in an offline mode. A payer payment application determines a transaction amount, for example, in accordance with payer input commands, before confirming the transaction can proceed based on the transaction amount and a payer available funds amount. A transaction message is then provided to the payee client device via the communications channel, with the transaction message including message transaction details including at least the transaction amount. The payer payment application also generates a transaction request including transaction request details, with this being encrypted using a public key of a payment processing device public/private key pair, before being stored, and finally, a payer available funds amount.

Meanwhile, the payee application receives the transaction message, using this to determine the transaction amount, which is then used to update a payee available funds amount. The payee payment application generates a transaction confirmation using the transaction details obtained from the transaction message, before encrypting the transaction confirmation using the payment processing device public key, and storing the encrypted transaction confirmation.

Subsequently, in an online mode the payer payment application and payee payment application provide the encrypted transaction request and transaction confirmation to the payment processing device. The payment processing device then decrypts the transaction request and transaction confirmation, using the private key of the payment processing device public/private key pair, before comparing the confirmation and request transaction details to ensure these match. The payment processing device then selectively processes the transaction in accordance with the results of the comparison. The payment processing device can then update payee and payer account balances associated with payer and payee accounts, so that these reflect the transaction, ensuring the changes performed in the offline mode are now reflected in the payee and payer accounts. Finally, the payer payment application can update the number of payer offline transactions, so that further offline transactions can be performed without breaching the offline transaction limit.

It will be appreciated that the above described arrangement therefore allows for an offline transaction to be performed between a payee and payer. In particular, the above described process provides a mechanism for the transaction to be initiated in an offline mode, with the transaction being confirmed in a subsequent online mode, thereby allowing normal transaction checking processes to be performed, so as to ensure security is maintained and prevent fraudulent transaction activity. Whilst the transaction has been described as a funds transfer from a payer to a payee, it will be appreciated that other transactions could be performed in a similar manner. Additionally, it will be appreciated that the payee and payer could be any form of entity and could be individuals, companies, corporations or the like, allowing transactions to be performed in a private and/or commercial environment, including allowing for transactions between a customer and a merchant, or the like.

A second example of a method for performing an offline transaction will now be described with reference to FIG. 2.

In this example, the transaction is performed by a user using a user client device executing a payment application, such as a mobile wallet, and could be performed to enable the user to allocate additional available funds to a payment application, or to allow the user to order products or services from a third party, such as a merchant.

In this example, at step 200 a transaction request message is created that includes a pre-defined user code and which is indicative of a transaction to be performed. The nature of the message and the manner in which this is created will vary depending upon the preferred implementation, but in one preferred example the message is an SMS (short message service) message, created using a messaging application executed by the client device. It will be appreciated, however, that other messages could be used depending on the circumstances. The pre-defined user code could be of any appropriate form and could include a unique alphanumeric code, or the like. The message could also include a code indicative of the transaction to be performed, such as a product code indicative of a product to be purchased. Alternatively, the nature of the transaction to be performed could be derived from a format of the message, or could be a default transaction defined for the respective user.

At step 210, the transaction request message is transferred to a payment processing device in accordance with a pre-defined destination address. Thus, this typically involves forwarding the transaction request message to a pre-defined phone number or the like, depending on the nature of the message.

The payment processing device receives the transaction request message, at step 220, and, at step 230, determines from the transaction request message at least a message originator address indicative of the client device sending the transaction request message and the pre-defined user code. The nature of the transaction to be performed can also be determined depending on the particular implementation.

At step 240, the payment processing device uses the pre-defined user code and the originator address to validate an identity of the user. In this regard, the originator address can then be used to retrieve a stored version of the user code, created during a setup process and retrained by the payment processing device, with this being compared to the received user code to determine if these match. As the user code is only known to the user, this can be used to ensure the user is the valid user of the client device. It is assessed whether the user is validated, at step 250, and if so, the transaction can be performed, at step 260, otherwise the transaction is refused, at step 270.

Accordingly, it will be appreciated that the above-described process allows a transaction to be performed solely on the basis of a single message sent from a user client device.

In one preferred example, the message can be an SMS allowing this to be transferred via a GSM (Global System for Mobile communications) network, when traditional data services, such as GPRS, 3G, or the like, are unavailable. This system works because GSM coverage is generally far more wide spread and reliable, meaning that in many scenarios in which the client device is effectively in an offline mode and unable to use data communication, transfer of text messages is still feasible.

Accordingly, the above-described process enables a transaction to be performed utilizing the text message service only, allowing the transaction to be performed when the client device is effectively offline, in the sense that it is unable to undergo data communication with the payment processing device. Despite this, security of the transaction process is maintained through the use of a unique user code that can be included within the message, allowing the identity of the user to be validated.

A number of further features will now be described.

As previously mentioned, the transaction request is typically an SMS message and this typically includes a predetermined format. The format can be of any appropriate form but typically includes the user code, an optional product code and a mobile number, the mobile number corresponding to the number of the client device. It will be appreciated however that other information may also be provided, such as a transaction amount, or the like, depending on the preferred implementation.

In order for the SMS process to operate correctly, the client device typically creates a first transaction request message, including a message header including the destination address of the payment processing device and a message payload including the pre-defined user code and an indication of the transaction to be performed. The first transaction message is then sent to a communications centre, which is responsive to the first transaction request message to provide a second transaction request message to the destination address, with the second transaction request message including a message header including the originator address and the message payload. In this example, the second transaction request message is received from the communications centre allowing the payment processing device to determine the originator address from the message header. The identity of the user and the indication of the transaction to be performed are obtained from the message payload before the identity of the user is validated and the transaction selectively performed. It will be appreciated that in the above arrangement, the first and second transaction request messages correspond to SMS-submit and SMS-deliver messages respectively, although this is not essential, and the messages used will depend on the particular SMS implementation.

The indication of a transaction to be performed can be of any appropriate form. In one example, this is in the form of a transaction code, which is indicative of the transaction. The transaction code could be a pre-defined alphanumeric code which can then be used by the payment processing device to identify the transaction to be performed. Alternatively, the transaction could be identified utilizing a format of the message, such as a particular order of information included within the message.

In one example, the transaction involves updating available funds associated with a payment application executed by the client device. The funds are typically updated in accordance with a transaction amount, which could be a pre-defined default amount, or an amount specified in the transaction request message. In this example, the payment processing device causes an account of the user to be debited in accordance with the transaction amount, creates a transaction response message and transfers the transaction response message to the client device. The client device receives the transaction response message and updates the available funds in accordance with the transaction amount. In this regard, the transaction response message can include an indication of the transaction amount or an available funds amount, allowing this to be used by the payment application to update the available funds amount.

The transaction response message is typically an SMS message, and will be transferred via a communications centre in a manner similar to that described above with respect to the transfer request message. Thus, this will typically involve transferring a first response message to the communications centre, with the communications centre transferring a second response message to the client device. Once the SMS message is received by the client device, this can be detected by the payment application, allowing this to update the available funds balance. As part of this process, the client device may perform a check to ensure the message has been received from the payment processing device, for example, based on an originator address in the message. It will be appreciated that this allows the payment application to maintain a correct record of available funds even while in an offline mode.

It will be appreciated from this that the above described process can be used to recharge an available funds amount associated with a mobile wallet application, and can therefore be used in conjunction with the previously described payer to payee transaction, for example, allowing mobile wallet available funds to be topped-up prior to or after performing a payer to payee transaction.

In one example, the transaction amount is a pre-defined amount. In this example, each time the message is received, the payment processing device can automatically credit the user's payment application available funds with a predetermined quantity of funds. Alternatively, the message can include the transaction amount, thereby allowing the user to specify the transaction amount. Alternatively, when the transaction relates to the purchase of a product the transaction amount will simply be for the cost of the product and any associated charges, such as processing fees, delivery charges, or the like.

In this latter case, when the transaction involves acquiring a product the transaction request message includes a product code indicative of an identity of the product. In this example, the payment processing device determines, using the product code, a product price and an identity of a merchant supplying the product. The payment processing device then causes an account of the user to be debited based, at least partially, in accordance with the product price, for example, allowing a transaction fee to be applied, before determining a delivery address of the user. The payment processing device then causes the merchant to provide the product to the defined delivery address. Again, the delivery address will typically be stored as part of user data retained by the payment processing device.

The method typically includes retrieving an indication of a user account of the user from stored user data in accordance with the identity of the user. Thus, it will be appreciated that the user typically nominates a predetermined account for use with message transactions with this automatically being debited by the payment processing device. However, as an alternative, the user could specify an account as part of the message, for example, by including an account code indicative of the user account as part of the message.

Accordingly, the above described process allows transactions to be performed using SMS messages having codes contained therein.

Figure 3:
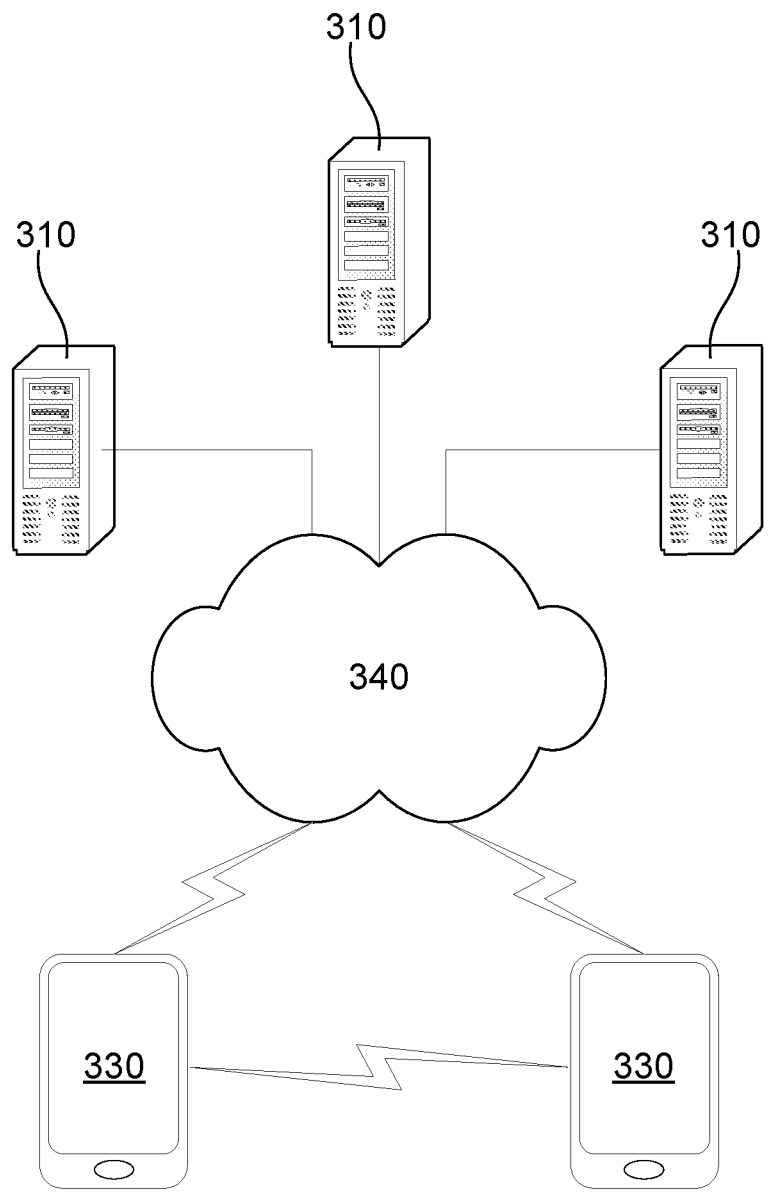
FIG. 3 is a schematic diagram of an example of a system for performing a transaction.

An example of a system for performing transactions will now be described with reference to FIG. 3.

In this example, a number of processing systems 310 are provided coupled to one or more client devices 330, via one or more communications networks 340, such as the Internet, and/or a number of local area networks (LANs).

It will be appreciated that any number of processing systems 310 and client devices 330 could be provided, and the current representation is for the purpose of illustration only. The configuration of the networks 340 is also for the purpose of example only, and in practice the processing systems 310 and client devices 330 can communicate via any appropriate mechanism, such as via wired or wireless connections, including, but not limited to, mobile networks, private networks, such as an 802.11 networks, the Internet, LANs, WANs, or the like, as well as via direct or point-to-point connections, such as Bluetooth®, or the like.

In use, the processing systems 310, are adapted to perform various data processing tasks forming part of a transaction process, and the particular functionality will vary depending on the particular requirements. For example, the processing systems can be adapted to determine transaction details, determine transaction fees, perform authentication, perform payments, or cause further payment processing devices (not shown), such as servers of financial institutions, payment gateways or the like, to perform payments, as will be appreciated by persons skilled in the art.

Whilst the processing systems 310 are shown as single entities, it will be appreciated they could include a number of processing systems distributed over a number of geographically separate locations, for example as part of a cloud based environment. Thus, the above described arrangements are not essential and other suitable configurations could be used.

Figure 4:
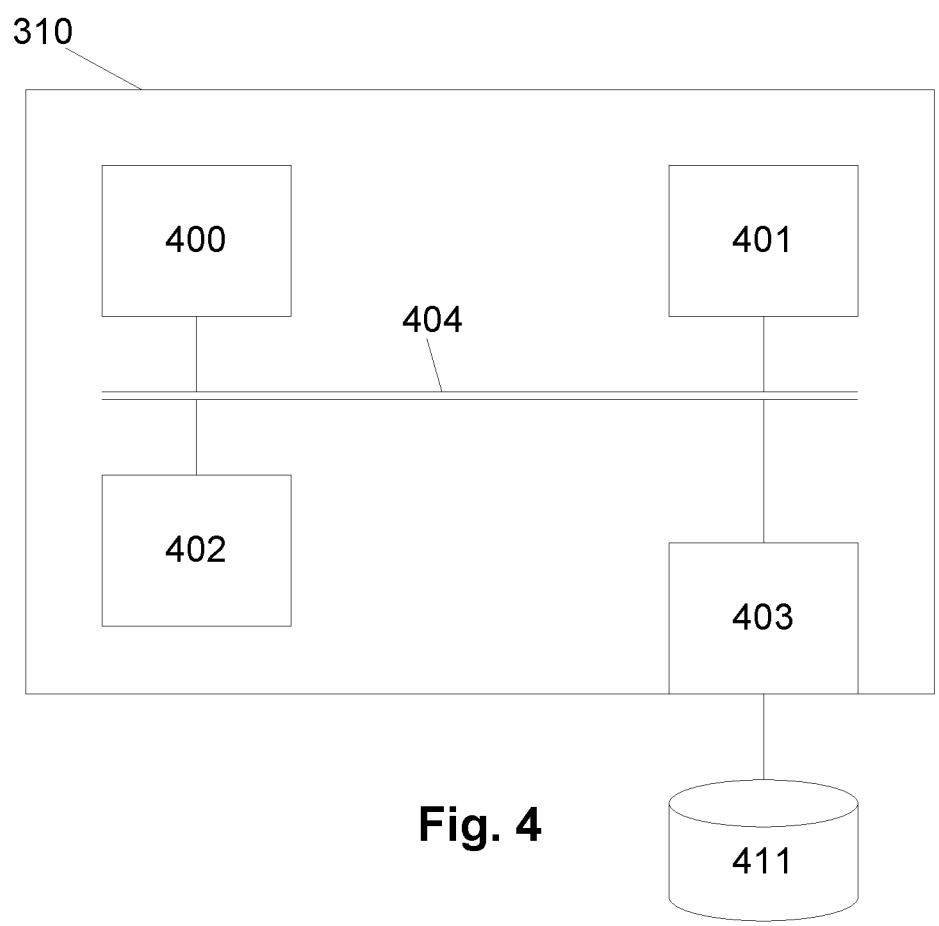
FIG. 4 is a schematic diagram of an example of a processing system of FIG. 3.

An example of a suitable processing system 310 is shown in FIG. 4.

In this example, the processing system 310 includes at least one microprocessor 400, a memory 401, an optional input/output device 402, such as a keyboard and/or display, and an external interface 403, interconnected via a bus 404, as shown. In this example the external interface 403 can be utilized for connecting the processing system 310 to peripheral devices, such as the communications networks 340, databases 411, other storage devices, or the like. Although a single external interface 403 is shown, this is for the purpose of example only, and in practice multiple interfaces using various methods (e.g., Ethernet, serial, USB, wireless, or the like) may be provided.

In use, the microprocessor 400 executes instructions in the form of applications software stored in the memory 401, to allow the required processes to be performed. The applications software may include one or more software modules, and may be executed in a suitable execution environment, such as an operating system environment, or the like.

Accordingly, it will be appreciated that the processing system 310 may be formed from any suitable processing system, such as a suitably programmed transaction terminal, PC, web server, network server, or the like. In one particular example, the processing system 310 is a standard processing system, such as an Intel Architecture based processing system, which executes software applications stored on non-volatile (e.g., hard disk) storage, although this is not essential. However, it will also be understood that the processing system could be any electronic processing device, such as a microprocessor, microchip processor, logic gate configuration, firmware optionally associated with implementing logic, such as an FPGA (Field Programmable Gate Array), or any other electronic device, system or arrangement.

Figure 5:
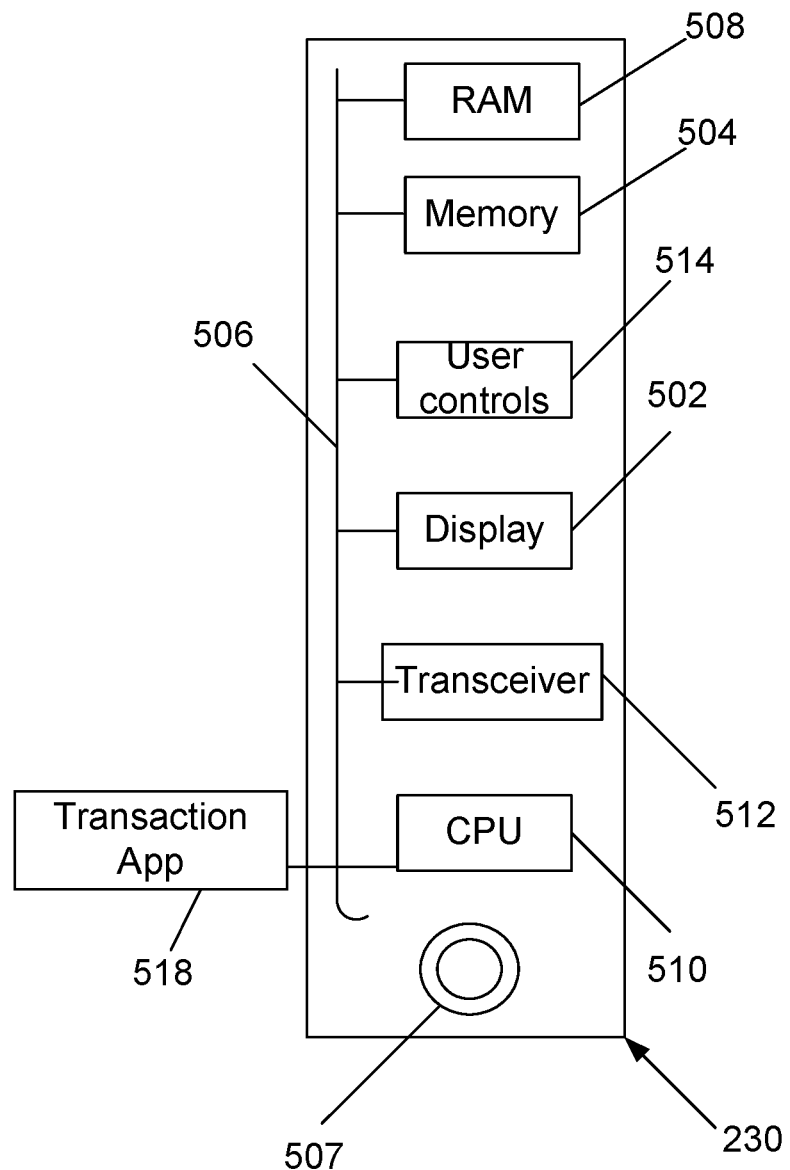
FIG. 5 is a schematic diagram of an example of a client device of FIG. 3.

In one example, the client device 330 is a handheld computer device, such as a smart phones or a PDA, such as one manufactured by Apple™, LG™, HTC™, Research In Motion™, or Motorola™. In one particular example, the client device 330 includes a mobile phone or a computer, such as a tablet computer. An exemplary embodiment of the client device 330 is shown in FIG. 5. As shown, the client device 330 includes the following components in electronic communication via a bus 506:

1. a display 502;
2. non-volatile memory 504;
3. random access memory ("RAM") 508;
4. N processing components 510;
5. a transceiver component 512 that includes N transceivers;
6. user controls 514;
7. microphone/speaker 507.

Although the components depicted in FIG. 5 represent physical components, FIG. 5 is not intended to be a hardware diagram; thus many of the components depicted in FIG. 5 may be realized by common constructs or distributed among additional physical components. Moreover, it is certainly contemplated that other existing and yet-to-be developed physical components and architectures may be utilized to implement the functional components described with reference to FIG. 5.

The display 502 generally operates to provide a presentation of content to a user, and may be realized by any of a variety of displays (e.g., CRT, LCD, HDMI, micro-projector and OLED displays). And in general, the non-volatile memory 504 functions to store (e.g., persistently store) data and executable code including code that is associated with the functional components of a browser component and a transaction App 518. In some embodiments, for example, the non-volatile memory 504 includes bootloader code, modem software, operating system code, file system code, and code to facilitate the implementation of one or more portions of the transaction App 518, as well as other components well known to those of ordinary skill in the art that are not depicted for simplicity.

In many implementations, the non-volatile memory 504 is realized by flash memory (e.g., NAND or ONENAND memory), but it is certainly contemplated that other memory types may be utilized as well. Although it may be possible to execute the code from the non-volatile memory 504, the executable code in the non-volatile memory 504 is typically loaded into RAM 508 and executed by one or more of the N processing components 510.

The N processing components 510 in connection with RAM 508 generally operate to execute the instructions stored in non-volatile memory 504 to effectuate the functional components. As one of ordinarily skill in the art will appreciate, the N processing components 510 may include a video processor, modem processor, DSP, graphics processing unit (GPU), and other processing components.

The transceiver component 512 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

Accordingly, it will be appreciated that the client device 330 may be formed from any suitably programmed processing system and could include suitably programmed PCs, Internet terminal, lap-top, or hand-held PC, a tablet, a smart phone, or the like. However, it will also be understood that the client device 330 can be any electronic processing device, such as a microprocessor, microchip processor, logic gate configuration, firmware optionally associated with implementing logic, such as an FPGA (Field Programmable Gate Array), or any other electronic device, system or arrangement.

Examples of the processes for performing transactions will be described in further detail below. For the purpose of these examples it is assumed that the processing systems 310 are payment servers that provide payment processing functionality, and in one example provide payment network functionality including communicating with acquirers or issuers as required in order to perform transactions. The payment servers typically execute processing device software, allowing relevant actions to be performed, with actions performed by the payment server being performed by the processor 400 in accordance with instructions stored as applications software in the memory 401 and/or input commands received from a user via the I/O device 402. It will also be assumed that actions performed by the client device 330 are performed by the processor 510 in accordance with instructions stored as applications software in the memory 504 and/or input commands received from a user via the user controls 514.

However, it will be appreciated that the above described configuration assumed for the purpose of the following examples is not essential, and numerous other configurations may be used. It will also be appreciated that the partitioning of functionality between the different processing systems may vary, depending on the particular implementation.

Figure 6A:
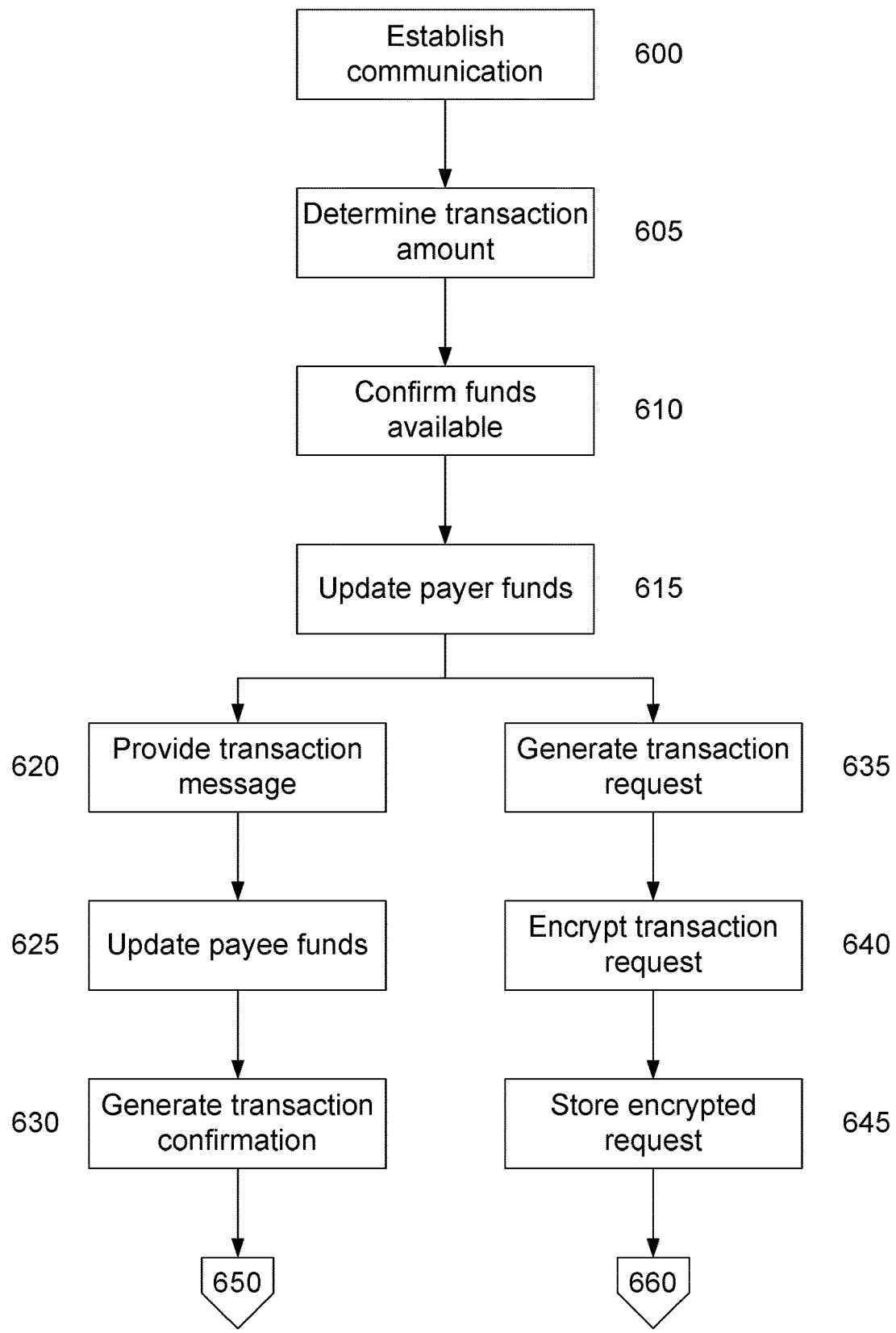
FIGS. 6A and 6B are a flow chart of a further example of a method for performing a transaction.

A specific example of a process for performing an offline transaction will now be described with reference to FIGS. 6A and 6B.

In this example, at step 600, a communication channel is established between the payee and payer client devices 330. In particular, the communications channel is typically a Bluetooth® or NFC communications channel which can be established by having each user execute the payment application and selecting an offline payment option. Selecting this option can place the client device in a "pairing" mode allowing this to communicate with the other client device.

At step 605, a transaction amount is determined. The transaction amount would typically be agreed upon verbally by the users, with the payer then entering the transaction amount into their respective client device 330.

At step 610, the payment application of the payer's client device 330 confirms that sufficient funds are available to proceed with the transaction. If not, the process can end or allow the payer to update the transaction amount. Otherwise, the payer's funds are updated, at step 615, to reflect a new level of available funds based on the previous level of funds, the transaction amount and any optional fees.

At step 620, a transaction message is provided to the payee client device 330. The payee client device 330 receives the transaction message and updates payee funds by adding the transaction amount to the current available funds, at step 625. Additionally, at step 630 the payee payment application generates a transaction confirmation message based on transaction details included in the transaction message.

Simultaneously with this process, at step 635, the payer payment application generates a transaction request which is then encrypted, at step 640. The encryption is typically performed using a public key of a private/public key pair of the payment system with the encrypted request being stored, at step 645.

Figure 6B:
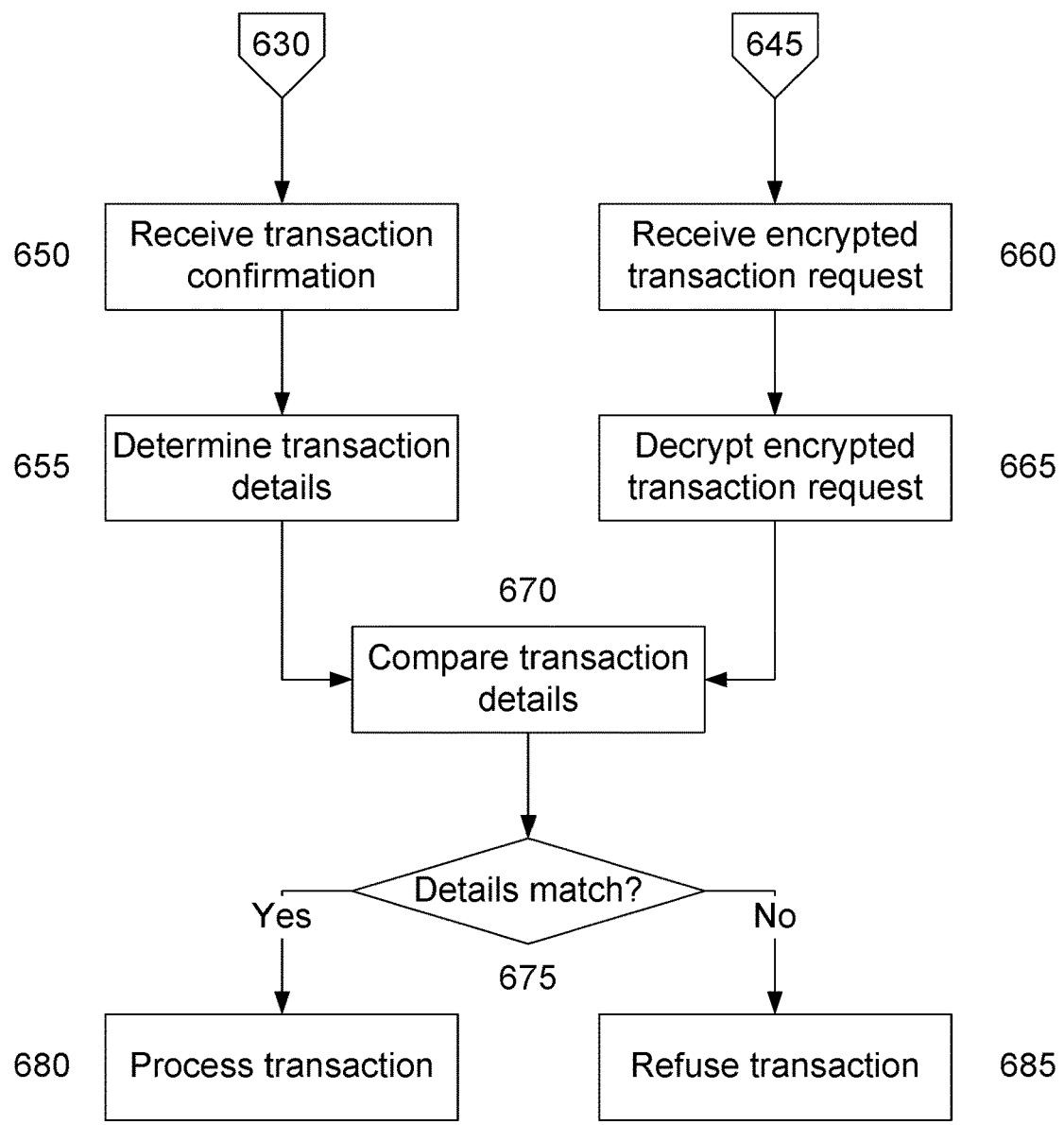
Figure 7A:
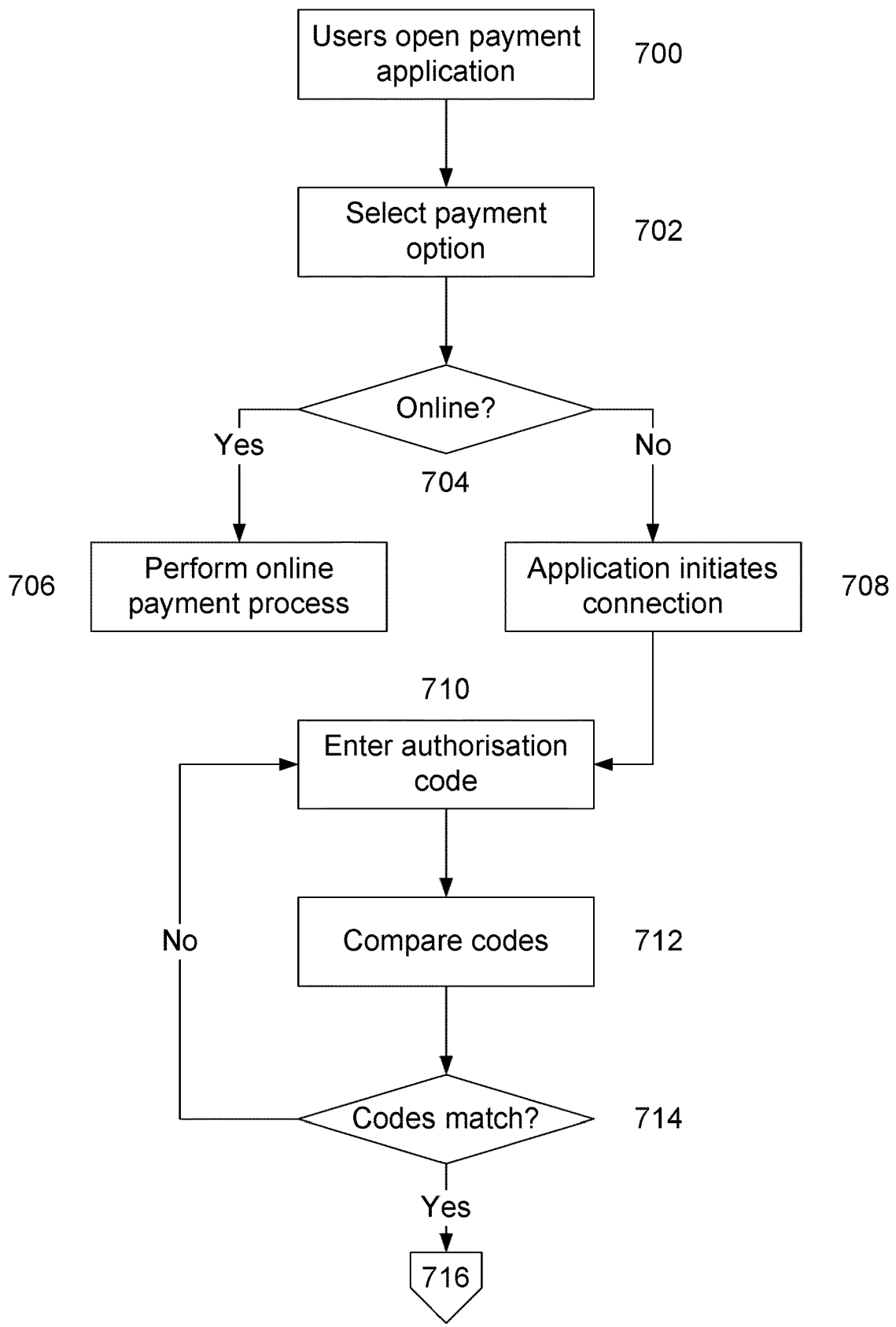
FIGS. 7A to 7E are a flow chart of a further specific example of a method for performing a transaction; and, FIGS. 8A to 8C are a further specific example of a method for performing a transaction.
Figure 7B:
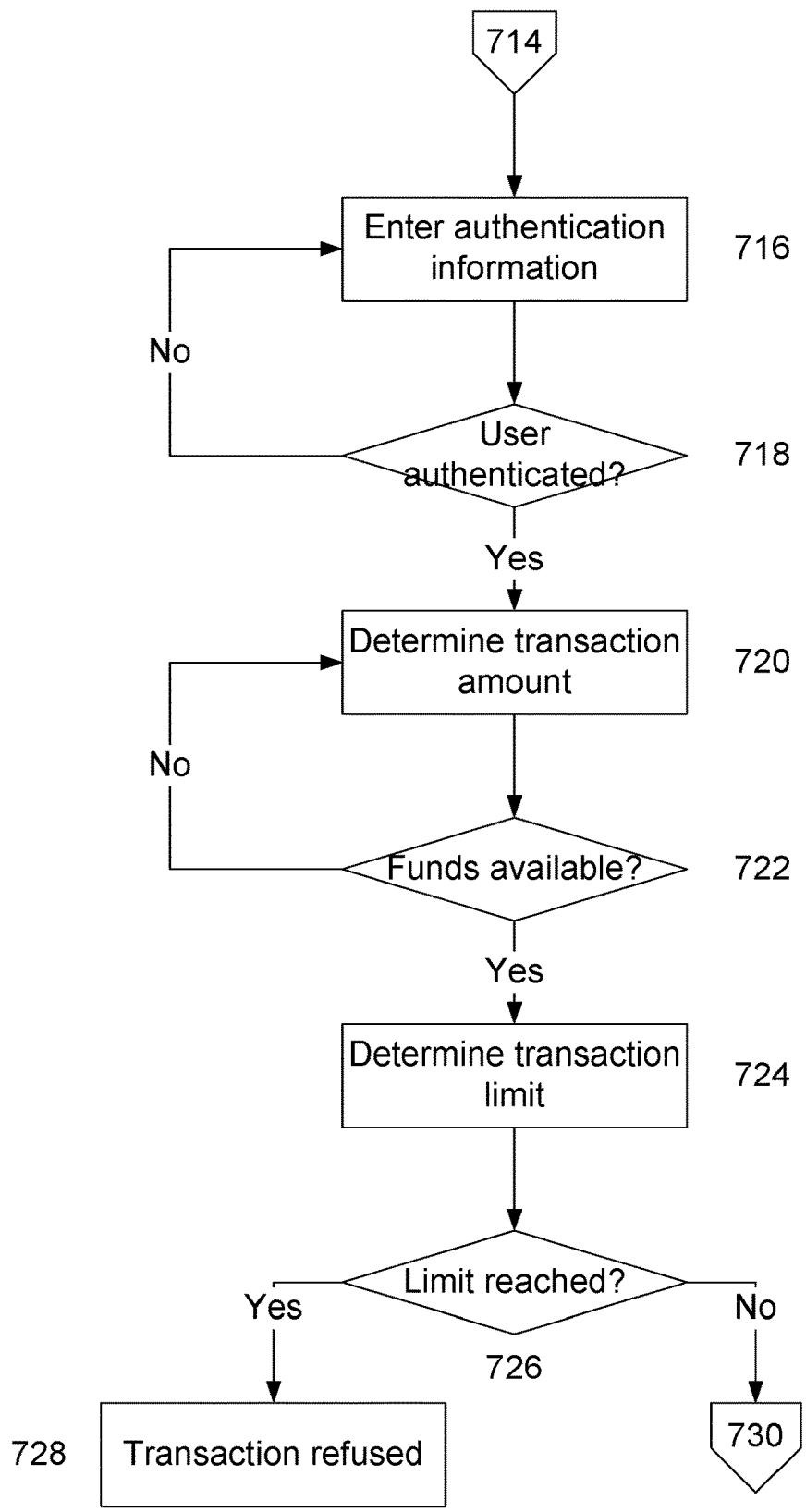
Figure 7C:
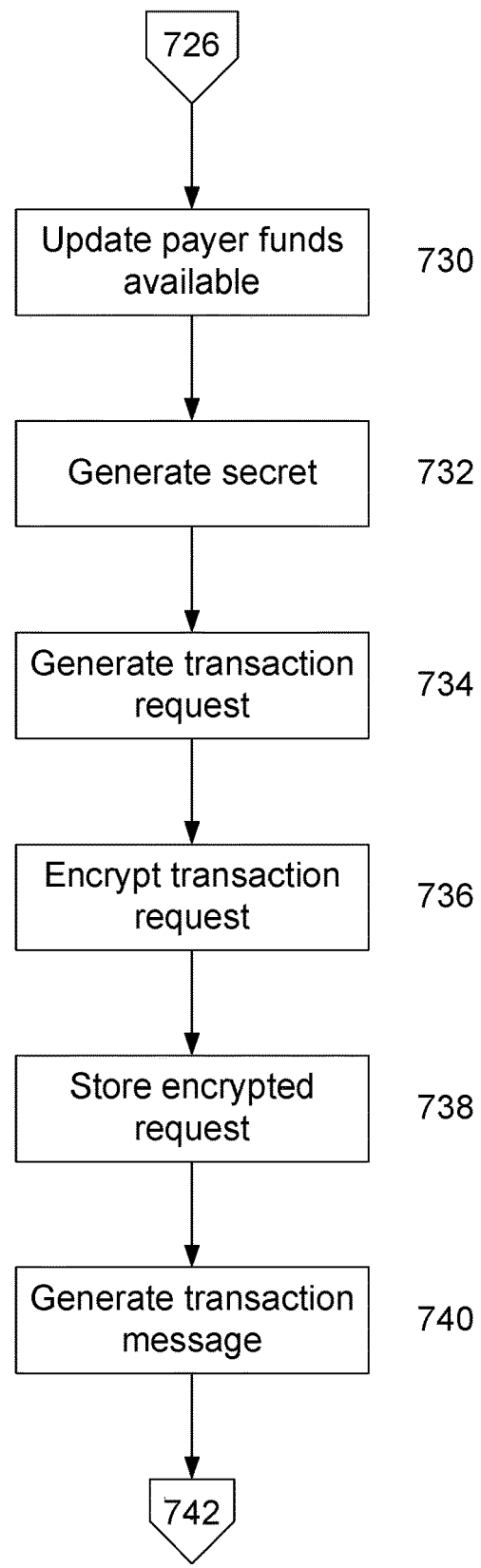
Figure 7D:
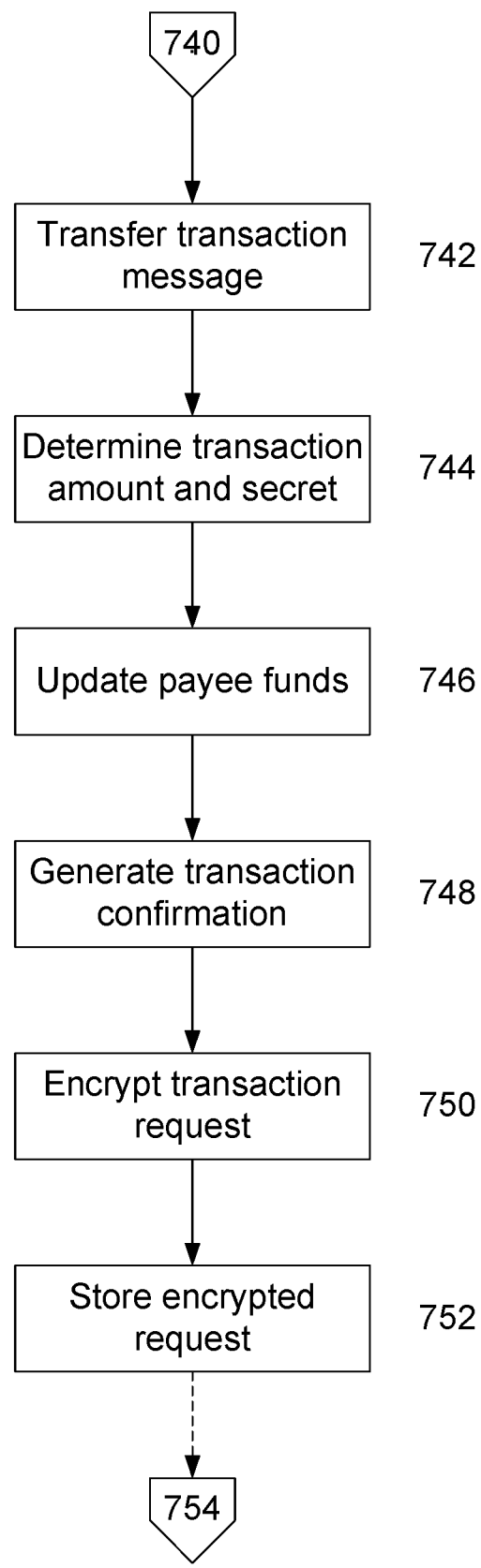
Figure 7E:
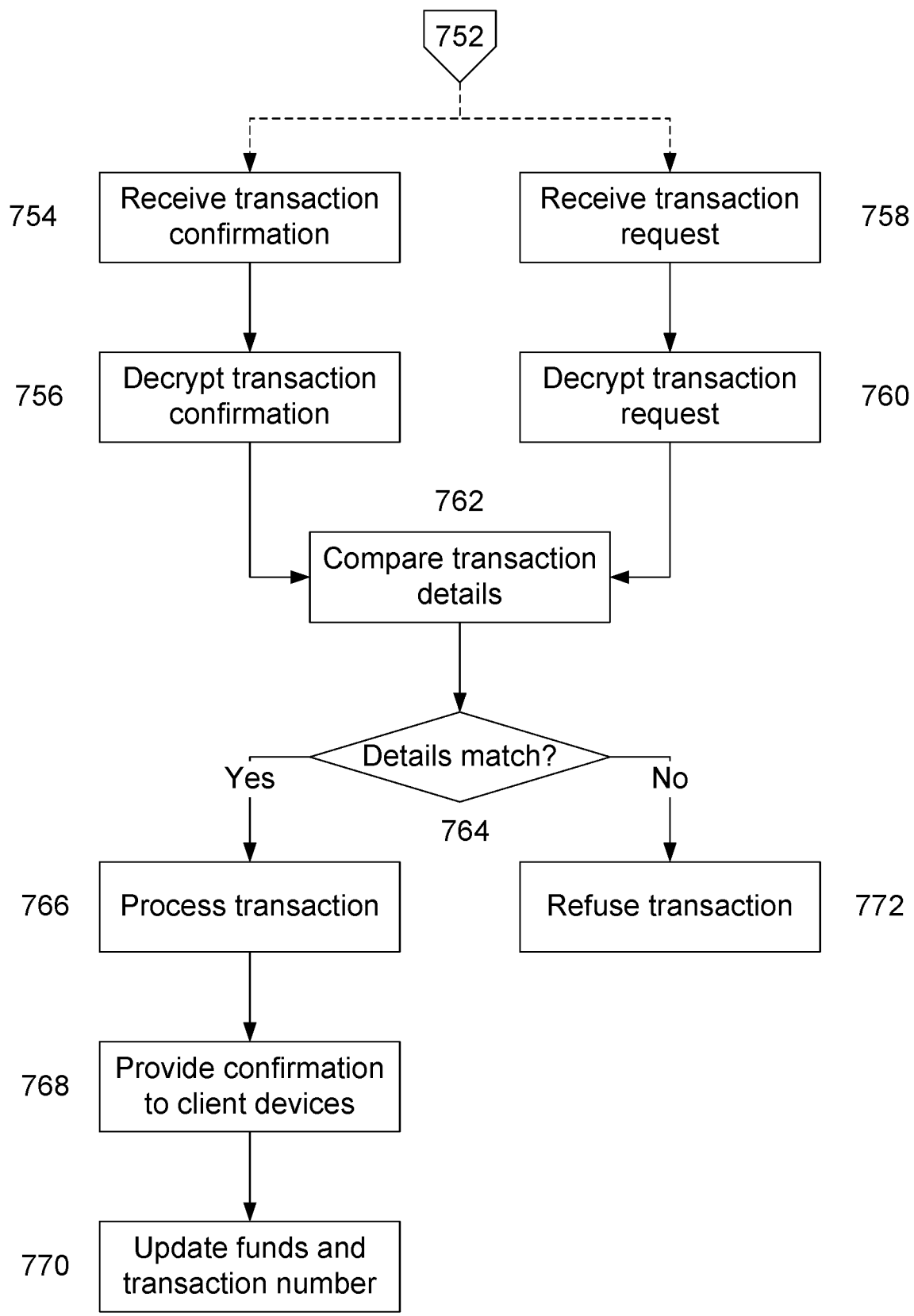

The online operation is shown in FIG. 6B. In this example, the transaction confirmation and encrypted transaction request are transmitted to the payment server, which receives these, at steps 650 and 660 respectively. The payment server determines confirmation and request transaction details from the transaction confirmation and the encrypted transaction request respectively, at steps 655 and 665.

At step 670, the payment server compares the transaction details retrieved from the transaction confirmation and the transaction request to confirm that these match. If it is determined that these match, at step 675, the transaction can be processed, at step 680, for example, by debiting an account of the payer and crediting an account of the payee. It will be appreciated that this process is typically achieved by having the payment server communicate with account issuers of the payee and payer respectively. Alternatively, the transaction can be refused, at step 685, for example, if the transaction details do not match, in which case the payment server will typically notify the payee and payer payment applications causing the updated available funds balance to be returned to the balances prior to the transaction being performed.

A more in depth specific example will now be described with reference to FIGS. 7A to 7E.

In this example, at step 700, the payer and payee open a payment application on their respective client devices, selecting a payment option, at step 702. At step 704, the payment applications query the respective client device to determine if the client device is currently online. If both client devices are currently online, a traditional payment process is performed, at step 706. Such an online payment process is known and this will not therefore be described in any further detail.

If however it is determined that either one or both of the client devices are not online, the process proceeds, to step 708, with the payment applications initiating a connection between the client devices 330.

At step 710, the users are required to enter authorization codes. This is typically achieved by having the payment applications communicate and select one of the applications to generate an authorization code, which is then displayed by the respective client device. The authorization code is then communicated to the other user, who enters the authorization code into their own client device. The authentication codes are then compared, at step 712, by either or both of the client devices to determine if the codes match, at step 714. If the codes do not match this process can be repeated until a match is established. Otherwise the process fails.

Assuming the codes match, at step 716, the payer is typically required to enter authentication information in order to allow the transaction to proceed. The authentication information can include biometric information or a PIN or other unique identifier. The information is entered and used by the payment application to authenticate the user. If the user is not authenticated, at step 718, the process can be repeated, or can fail with the transaction being halted. Whilst it has only been described that the payer undergoes authentication, it will be appreciated that similarly the payee may also undergo authentication. It will also be appreciated that authentication might be performed at another stage in the process, such as when initially opening the payment application, prior to or following selection of the payment option.

Once the payer, and optionally the payee, have been successfully authenticated, a transaction amount is determined, at step 720. This is typically achieved by displaying a prompt to the payer, via the payer payment application, with the user manually entering the transaction amount via the prompt. At step 722, the payer payment application determines if sufficient funds are available and if not the user can be alerted, allowing an alternative transaction amount to be defined. In the event that this does not occur, the process can fail.

At step 724, the payer payment application determines a current offline transaction limit, which is a limit on the number of offline transactions that may occur without connection to the payment system. At step 726, the payer payment application determines if the limit has been reached and if so, the transaction is refused, at step 728.

Otherwise, at step 730, the payer payment application updates the payer funds available before generating a secret, at step 732. The secret could correspond to an encryption key, a message generated using an encryption key, a unique number, which could be randomly generated, or the like.

At step 734, the payer application generates a transaction request, including transaction details, such as the transaction amount, an identity of the payee and the secret, with this then being encrypted, at step 736, using a public key of the payment server. The encrypted request is then stored, at step 738, in the client device 330 until such time as the client device 330 returns to an online state and is able to communicate with the payment server.

Additionally, at step 740, the payer payment application generates a transaction message including message transaction details, again including at least the transaction amount and an indication of the secret. At step 742, the transaction message is transferred to the payee client device 330, with the transaction message being optionally encrypted prior to transfer, depending upon the preferred implementation.

At step 744, the payee payment application receives the transaction message, decrypting this if necessary, before determining the transaction amount and secret, using the transaction amount to update payee available funds, at step 746.

At step 748, the payee payment application generates a transaction confirmation including confirmation transaction details, including the transaction amount and either the secret or information derived using the secret. The transaction request can then optionally be encrypted, at step 750, and stored in the respective payee client device 330, at step 752.

Once the payer and payee client devices return to an online state they forward the stored encrypted transaction confirmation and transaction requests which are received by the payment server, at steps 754 and 758 respectively. The transaction request and transaction confirmation are decrypted, at step 756 and 760 respectively, allowing the payment server to determine respective transaction details including the secret or information derived therefrom and the transaction amount. The transaction details are then compared, at step 762, to determine if a match exists.

If a match is identified, at step 764, the process moves to step 766, allowing the transaction to be processed. Confirmation of this is then provided to the respective client devices, at step 768, allowing the available funds to be confirmed and a number of offline transactions to be reset, at step 770, thereby allowing further offline transactions to be confirmed. Otherwise the transaction is refused, at step 772.

Figure 8A:
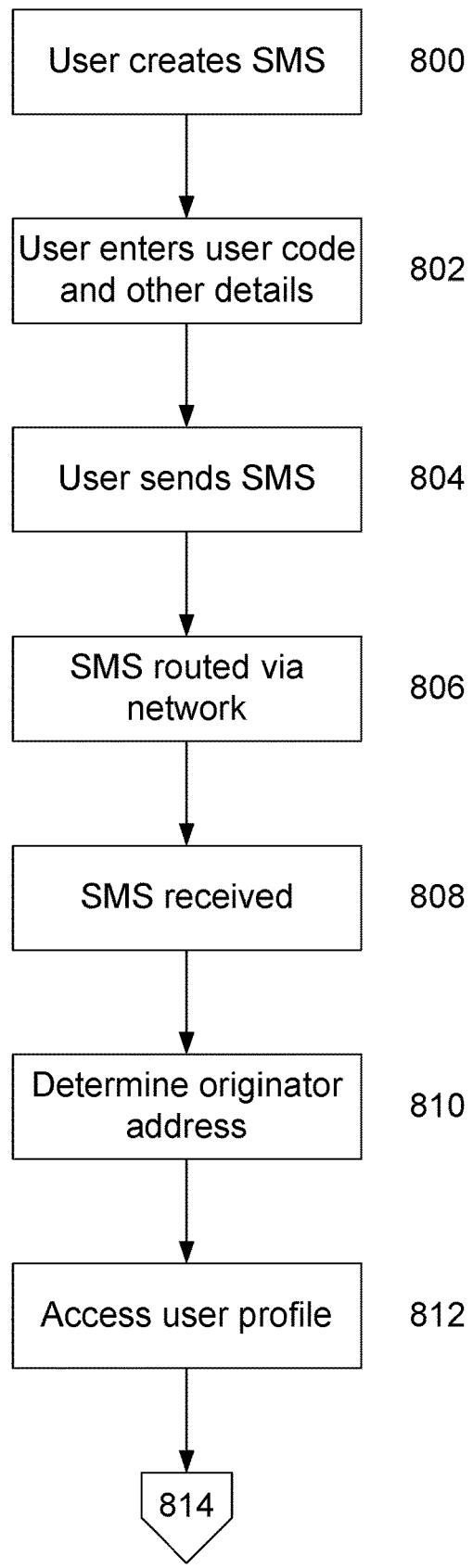
Figure 8B:
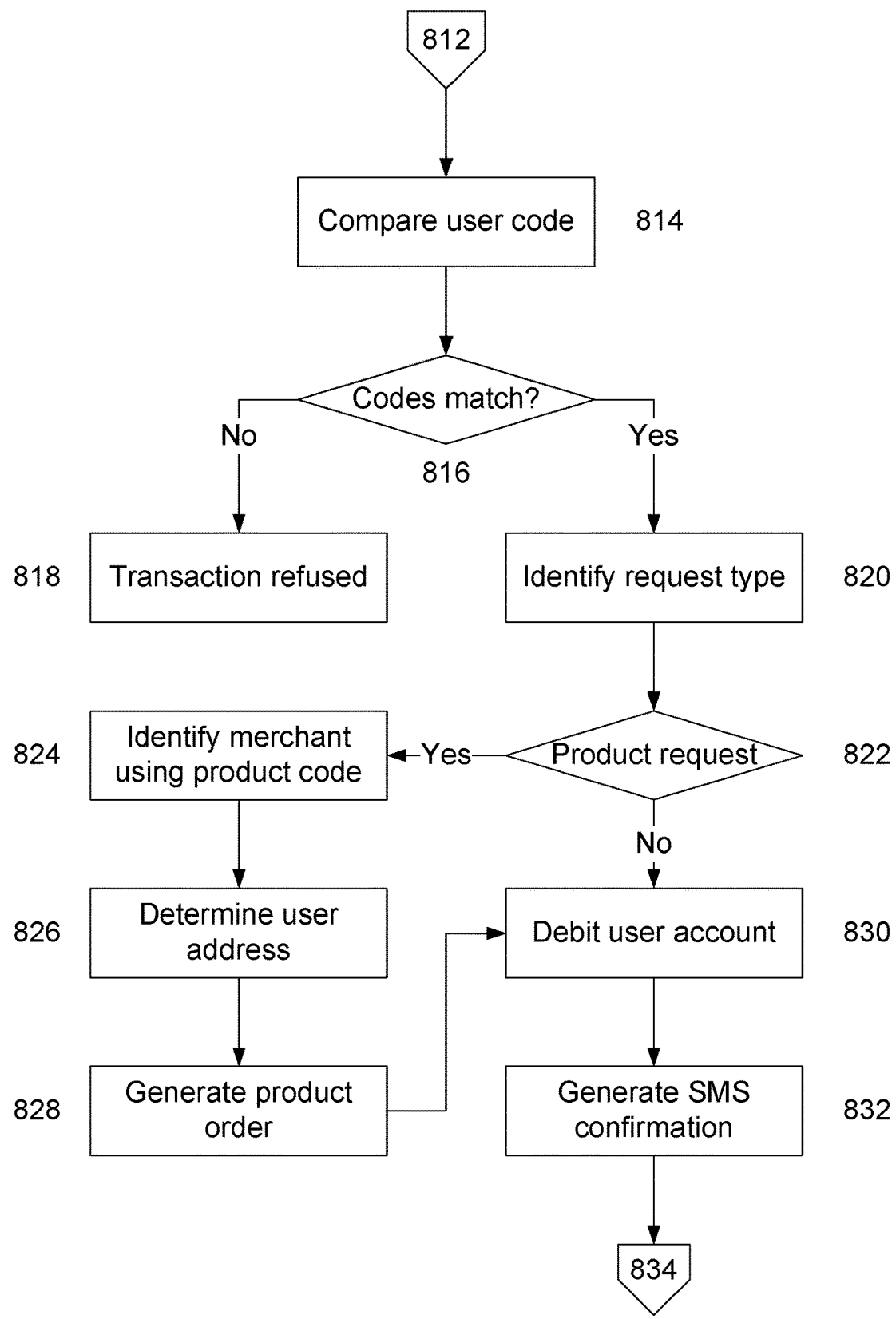
Figure 8C:
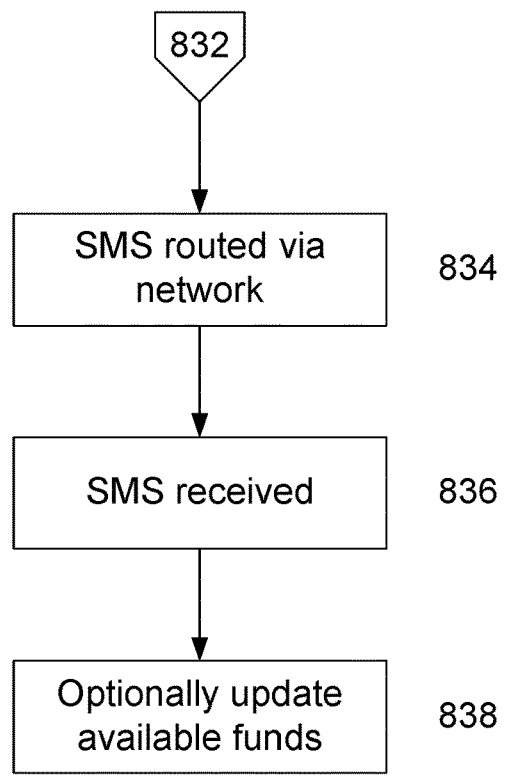

A further example of an offline payment system will now be described with reference to FIGS. 8A to 8C.

In particular, in this example, at step 800, the user creates an SMS message having a predetermined format. As part of this, the user enters a user code and other details, such as a product code, phone number or the like, at step 802. An example SMS message format is as follows: <Unique Code><Mobile number><Product code>.

In this example, the unique code corresponds to a unique number assigned to the respective user during a registration process, which is also stored as part of profile data retained by the payment server. The mobile number corresponds to the mobile phone number of the client device hosting the mobile wallet application, whilst the product code identifies a product that the user wishes to purchase, which could refer to a physical item, or an amount of funds to be transferred to the user's mobile wallet application.

At step 804 the user sends the SMS with this being routed by the GSM network, at step 806, and received by the payment server, at step 808. It will be appreciated that the routing is performed by having the user send the SMS to a phone number associated with the payment server. As the SMS is routed via the network, typically being received by a communications centre and with the destination phone number being replaced by the originator phone number of the client device, in accordance with standard SMS transmission protocols.

At step 810, the received SMS is reviewed by the payment server to determine the originator address. The originator address is uniquely associated with the user profile of the user during a registration process, allowing the payment server to access the user profile, at step 812. The user code supplied as part of the SMS is then compared to the user code forming part of the user profile, at step 814, to determine if the codes match. If it is determined that the codes do not match, at step 816, the transaction is refused at step 818. Otherwise, the payment server operates to identify a request type, at step 820.

In this regard, the payment server can utilize the message format and/or content, such as the product code mentioned above, in order to determine whether the message relates to the purchase of a product, or a request for additional funds to be added to a payment application, such as a mobile wallet. If it is determined that the request is a product request, at step 822, a product code is used to identify a merchant, at step 824. In this regard, merchants will typically register with the system, providing the payment system with an indication of a unique product code which is associated with a particular product, in turn allowing the product code to be used to identify the respective merchant. Having identified the merchant, the payment server retrieves a previously specified user delivery address from the user profile, at step 826, using this together with the identity of the merchant to generate a product order which can then be transferred to the merchant to cause the merchant to provide the product to the respective delivery address. The product order will also allow the payment server to determine a product cost allowing the account of the user to be debited, at step 830.

In the event that the received SMS does not relate to a product request, then, in this example, it relates to a request to add funds to the payment application in which case the account can be debited directly, at step 830. This may be for a predetermined amount, or alternatively, could be in respect of an amount specified in the SMS message, for example, using a respective product code to correspond to a particular top-up amount.

At step 832, an SMS confirmation is generated and routed via the network, at step 834, allowing this to be received by the client device 330 and hence the payment application, at step 836. The payment application may then optionally update, at step 838, an indication of available funds either increasing this based on the request for additional funds or decrease this based on payment for the product.

Whilst the above-described example has been limited to a choice between purchasing a product or topping-up a mobile wallet application, it will be appreciated that in practice this is not so limited and the payment system could be used in respect of any form of transaction.

In any event, it will be appreciated that this provides a mechanism to allow a user to purchase products/services and/or update an available funds amount associated with a mobile wallet application, even in an offline situation. In this latter situation, it will be appreciated that this can be used in conjunction with the previously described transaction process, for example, to allow a user to top-up their mobile wallet application prior to or after transferring funds to a payee.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope of the present disclosure broadly appearing before described.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for performing a transaction, the system comprising:
 a payee client device, a payer client device, and at least one payment processing device;
 wherein the payer client device comprises a payer client device processor and a payer client device memory storing instructions for a payer payment application that, when executed by the payer client device processor, direct the payer client device to:
  in an offline mode:
   communicate with the payee client device regarding transaction details including at least a transaction amount for a transaction;
   generate a transaction request including request transaction details indicative of at least the transaction amount for the transaction;
   store the transaction request in memory; and
   update, at the payer client device, a payer available funds amount at least partially in accordance with the transaction amount;
  determine whether a connection is available to the at least one payment processing device for an online mode; and
  in response to a determination that the connection is available, in the online mode:
   provide the transaction request to the at least one payment processing device;
 wherein the payee client device comprises a payee client device processor and a payee client device memory storing instructions for a payee payment application that, when executed by the payee client device processor, direct the payee client device to:
  in an offline mode:
   communicate with the payer client device regarding the transaction details including at least the transaction amount for the transaction;
   generate a transaction confirmation including confirmation transaction details indicative of at least the transaction amount;
   store the transaction confirmation; and
   update, at the payee client device, a payee available funds amount at least partially in accordance with the transaction amount;
  determine whether a connection is available to the at least one payment processing device for an online mode; and
  in response to a determination that the connection is available, in the online mode:
   provide the transaction confirmation to the at least one payment processing device; and
 wherein the at least one payment processing device comprises a processor and a memory storing instructions that direct the at least one payment processing device to:

receive the transaction request from the payer client device;
receive the transaction confirmation from the payee client device;
compare the request transaction details of the transaction request and the confirmation transaction details of the transaction confirmation;
determine whether there is a match between the request transaction details of the transaction request and the confirmation transaction details of the transaction confirmation; and
in response to a determination of the match, process the transaction.

2. The system of claim 1, wherein the payer payment application further directs the payer client device to:
in the offline mode, encrypt the transaction request and to store the encrypted transaction request; and
in the online mode, provide the encrypted transaction request to the at least one payment processing device; and
wherein the instructions stored at the at least one payment processing device, further direct the at least one payment processing device to decrypt the transaction request to determine the request transaction details.

3. The system of claim 1, wherein the payee payment application further directs the payee client device to:
in the offline mode, encrypt the transaction confirmation and to store the encrypted transaction confirmation; and
in the online mode, provide the encrypted transaction confirmation to the at least one payment processing device; and
wherein the instructions stored at the at least one payment processing device, further direct the at least one payment processing device to decrypt the transaction confirmation to determine the confirmation transaction details.

4. The system of claim 1, wherein the payer payment application directs the payer client device to store the transaction request until at least one of:
i) the online mode is commenced by establishing communication with the at least one payment processing device; and
ii) a transaction query is received from the at least one payment processing device; and
wherein the payee payment application directs the payee client device to store the transaction confirmation until at least one of:
i) the online mode is commenced by establishing communication with the at least one payment processing device; and
ii) a transaction query is received from the at least one payment processing device.

5. The system of claim 1, wherein the payer payment application directs the payer client device to determine transaction details including the transaction amount in accordance with user input commands.

6. The system of claim 1, wherein at least one of the payer client device and the payee client device is configured to establish a short range wireless communications channel between the payee and payer client devices.

7. The system of claim 1, wherein one of the payer client device and the payee client device is configured to:
determine an authorization code;
compare the authorization code with an associated authorization code for the other of the payer client device and the payee client device; and
establish a short range wireless communications channel between the payee and payer client devices when the authorization codes match.

8. The system of claim 7, wherein one of the payer client device and the payee client device is configured to generate and display the associated authorization code; and
wherein the other of the payer client device and the payee client device is configured to receive entry of the associated authorization code, by a user, prior to comparing the authorization code with the associated authorization code.

9. The system of claim 1, wherein, to communicate with the payee client device, the payer payment application directs the payer client device to provide a transaction message to the payee client device via a communications channel therebetween, the transaction message including message transaction details including at least the transaction amount; and
wherein the payee payment application directs the payee client device to use the transaction message to generate the transaction confirmation.

10. The system of claim 1, wherein at least one of the payer client device and the payee client device is configured, in the offline mode, to:
establish a shared secret, the shared secret being shared by the payer and payee payment applications; and
wherein the at least one payment processing device is configured to use the shared secret to authorize the transaction.

11. The system of claim 10, wherein the at least one payment processing device is configured to:
determine an indication of the shared secret from each of the transaction request and the transaction confirmation; and
use each indication of the shared secret to authorize the transaction.

12. The system of claim 10, wherein the shared secret includes at least one of:
a secret key, a signature, a signature generated using a private key of a public/private key pair, and a signature generated using transaction details.

13. The system of claim 1, wherein the payer payment application further directs the payer client device to:
determine if a number of offline transactions will exceed a limit; and
permit the transaction to be performed when the number of offline transaction do not exceed the limit.

14. The system of claim 1, wherein the payer payment application further directs the payer client device to:
determine the transaction amount;
compare the transaction amount to a payer available funds amount;
determine whether there is sufficient payer available funds amount for the transaction amount; and
permit the transaction to be performed when there is sufficient payer available funds amount for the transaction.

15. The system of claim 1, wherein the payer payment application further directs the payer client device to:
determine payer authentication information;
attempt to authenticate the payer using the payer authentication information; and
permit the transaction to be performed when the payer is authenticated by the payer authentication information.

16. The system of claim 15, wherein the payer authentication information includes at least one of:

payer biometric information determined using a biometric reader and a PIN determined using payer input commands provided via an input device.

17. The system of claim 1, wherein the instructions stored at the at least one payment processing device further direct the at least one payment processing device to:
update a payee account balance in a payee account, at the payee client device, in accordance with the performed transactions; and
update a payer account balance in a payer account, at the payer client device, in accordance with the performed transactions.

18. The system of claim 1, wherein the request transaction details include:
the transaction amount, a payer funds amount, a transaction account identifier, a transaction identifier, a transaction time, a transaction date, a payer identifier, a payee identifier, a secret key, information encrypted using a secret key, and a signature generated using a private key of a payer public/private key pair; and
wherein the confirmation transaction details include:
the transaction amount, a transaction account identifier, a transaction identifier, a transaction time, a transaction date, a payer identifier, a payee identifier, a secret key, information encrypted using a secret key, and a signature generated using a private key of a payer public/private key pair.

19. A system for performing a transaction, the system comprising:
a payee client device, a payer client device, and at least one payment processing device;
wherein at least one of the payer client device and the payee client device is configured to establish a short range wireless communications channel between the payee and payer client devices, in an offline mode, to determine transaction details including at least a transaction amount; and
wherein the payer client device comprises a payer client device processor and a payer client device memory storing instructions for a payer payment application that, when executed by the payer client device processor, direct the payer client device to:
in an offline mode:
communicate with the payee client device regarding the transaction details via the short range wireless communications channel;
generate a transaction request including request transaction details indicative of at least the transaction amount, a payer identifier, a payee identifier, a transaction identifier, and information encrypted using a secret key;
store the transaction request; and
update, at the payer client device, a payer available funds amount at least partially in accordance with the transaction amount;
determine whether a connection is available to the at least one payment processing device for an online mode; and
in response to a determination that the connection is available, in the online mode:
provide the transaction request to the at least one payment processing device;
wherein the payee client device comprises a payee client device processor and a payee client device memory storing instructions for a payee payment application that, when executed by the payee client device processor, direct the payee client device to:
in an offline mode:
communicate with the payer client device regarding the transaction details via the short range wireless communications channel;
generate a transaction confirmation including confirmation transaction details indicative of at least the transaction amount;
store the transaction confirmation; and
update, at the payee client device, a payee available funds amount at least partially in accordance with the transaction amount;
determine whether a connection is available to the at least one payment processing device for an online mode; and
in response to a determination that the connection is available, in the online mode:
provide the transaction confirmation to the at least one payment processing device; and
wherein the at least one payment processing device comprises a processor and a memory storing instructions that direct the at least one payment processing device to:
receive the transaction request from the payer client device;
receive the transaction confirmation from the payee client device;
compare the request transaction details of the transaction request and the confirmation transaction details of the transaction confirmation;
determine whether there is a match between the request transaction details of the transaction request and the confirmation transaction details of the transaction confirmation; and
in response to a determination of the match, process the transaction.

20. A method comprising:
in an offline mode, at a payer client device:
communicating with a payee client device regarding transaction details including at least a transaction amount for a transaction;
generating a transaction request including request transaction details indicative of at least the transaction amount for the transaction;
storing the transaction request at the payer client device; and
updating, at the payer client device, a payer available funds amount at least partially in accordance with the transaction amount;
determining, at the payer client device, whether a connection is available to at least one payment processing device for an online mode;
in response to determining, at the payer client device, that the connection is available, in the online mode, providing the transaction request to the at least one payment processing device;
in an offline mode, at the payee client device:
communicating with the payer client device regarding the transaction details including at least the transaction amount for the transaction;
generating a transaction confirmation including confirmation transaction details indicative of at least the transaction amount;
storing the transaction confirmation at the payee client device; and
updating, at the payee client device, a payee available funds amount at least partially in accordance with the transaction amount;

determining whether a connection is available to the at least one payment processing device for an online mode;

in response to determining that the connection is available, in the online mode, providing the transaction confirmation to the at least one payment processing device;

receiving, at the at least one payment processing device, the transaction request from the payer client device;

receiving, at the at least one payment processing device, the transaction confirmation from the payee client device;

comparing, at the at least one payment processing device, the request transaction details of the transaction request and the confirmation transaction details of the transaction confirmation;

determining, at the at least one payment processing device, whether there is a match between the request transaction details of the transaction request and the confirmation transaction details of the transaction confirmation; and in response to determining there is the match, processing, at the at least one payment processing device, the transaction.

* * * * *